US012296603B2

(12) United States Patent
Ukai et al.

(10) Patent No.: US 12,296,603 B2
(45) Date of Patent: *May 13, 2025

(54) PRINTING CASSETTE WITH GEAR

(71) Applicant: BROTHER KOGYO KABUSHIKI KAISHA, Nagoya (JP)

(72) Inventors: Shinji Ukai, Kiyosu (JP); Kentaro Murayama, Kasugai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/599,056

(22) Filed: Mar. 7, 2024

(65) Prior Publication Data

US 2024/0208241 A1 Jun. 27, 2024

Related U.S. Application Data

(63) Continuation of application No. 17/702,725, filed on Mar. 23, 2022, now Pat. No. 11,951,753, which is a (Continued)

(30) Foreign Application Priority Data

Sep. 30, 2019 (JP) ................................ 2019-178164

(51) Int. Cl.

*B41J 2/325* (2006.01)
*B41J 3/36* (2006.01)

(Continued)

(52) U.S. Cl.

CPC ................ *B41J 2/325* (2013.01); *B41J 3/36* (2013.01); *B41J 15/044* (2013.01); *B41J 17/32* (2013.01);

(Continued)

(58) Field of Classification Search

CPC ... B41J 2/325; B41J 3/36; B41J 15/044; B41J 17/32; B41J 15/04; B41J 32/00; B65H 2405/10; B65H 2405/11

See application file for complete search history.

(56) References Cited

U.S. PATENT DOCUMENTS 3,672,603 A 6/1972 Swain
3,804,227 A 4/1974 Cappotto et al.

(Continued)

FOREIGN PATENT DOCUMENTS

CN 1744994 A 3/2006
CN 101910006 A 12/2010

(Continued)

OTHER PUBLICATIONS

Office Action for the related Chinese Patent Application No. 202080066740.9 dated Feb. 5, 2024.

(Continued)

*Primary Examiner* — Henok D Legesse

(74) *Attorney, Agent, or Firm* — KENEALY VAIDYA LLP

(57) ABSTRACT

A printing cassette includes: a case including a first case portion, a second case portion, and a third case portion; a first tape, at least a portion of which is accommodated in the third case portion; and a gear, a portion of which is accommodated in the second case portion and the other portion of which is located outside of the case, the gear being rotatable about a rotation axis parallel to a first direction. The first case portion has an outlet through which the first tape is discharged. The first case portion, the second case portion, and the third case portion are disposed in an order of the first case portion, the second case portion, and the third case portion in the first direction.

19 Claims, 16 Drawing Sheets

Related U.S. Application Data continuation of application No. PCT/JP2020/034876, filed on Sep. 15, 2020.

(51) Int. Cl.
*B41J 15/04* (2006.01)
*B41J 17/32* (2006.01)
*B41J 32/00* (2006.01)

(52) U.S. Cl.
CPC ................ *B41J 15/04* (2013.01); *B41J 32/00* (2013.01); *B65H 2405/10* (2013.01); *B65H 2405/11* (2013.01)

(56) References Cited

U.S. PATENT DOCUMENTS

| | | | |
|---|---|---|---|
| 3,823,808 | A | 7/1974 | Murata et al. |
| 3,948,382 | A | 4/1976 | Nesbitt et al. |
| 4,034,935 | A | 7/1977 | Plaza et al. |
| 4,252,450 | A | 2/1981 | Goodman et al. |
| 4,351,619 | A | 9/1982 | Duke et al. |
| 4,397,574 | A | 8/1983 | Wojdyla |
| 4,402,619 | A | 9/1983 | Paque et al. |
| 4,490,059 | A | 12/1984 | Daughters |
| 4,499,513 | A | 2/1985 | Umeda |
| 4,538,931 | A | 9/1985 | Nagashima |
| 4,565,128 | A | 1/1986 | Moriyama et al. |
| 4,598,780 | A | 7/1986 | Iwasaki et al. |
| 4,668,961 | A | 5/1987 | Hiramatsu |
| 4,832,514 | A | 5/1989 | Basile |
| 4,856,921 | A | 8/1989 | Hatakeyama |
| 5,099,378 | A | 3/1992 | Turgeon |
| 5,145,268 | A | 9/1992 | Cavallini |
| 5,325,114 | A | 6/1994 | Fogle et al. |
| 5,402,954 | A | 4/1995 | Skavnak et al. |
| 5,435,657 | A | 7/1995 | Pearce et al. |
| 5,472,286 | A | 12/1995 | Uemura et al. |
| 5,619,244 | A | 4/1997 | Manna |
| 5,645,360 | A | 7/1997 | Iwane et al. |
| 5,917,532 | A | 6/1999 | Cornell et al. |
| 5,959,652 | A | 9/1999 | Privin |
| 6,082,913 | A | 7/2000 | Yamamoto et al. |
| 6,511,238 | B1 | 1/2003 | Glize |
| 11,951,753 | B2 * | 4/2024 | Ukai ...................... B41J 15/044 |
| 2006/0146081 | A1 | 7/2006 | Vandermeulen et al. |
| 2006/0165461 | A1 | 7/2006 | Vandermeulen et al. |
| 2006/0238600 | A1 | 10/2006 | Vandermeulen et al. |
| 2007/0009302 | A1 | 1/2007 | Vandermeulen |
| 2007/0172286 | A1 | 7/2007 | Pomfret |
| 2008/0084494 | A1 | 4/2008 | Pomfret |
| 2008/0213023 | A1 | 9/2008 | Koizumi et al. |
| 2009/0148222 | A1 | 6/2009 | Terry et al. |
| 2010/0166475 | A1 | 7/2010 | Yamaguchi et al. |
| 2010/0166477 | A1 | 7/2010 | Yamaguchi et al. |
| 2010/0166478 | A1 | 7/2010 | Yamaguchi et al. |
| 2010/0166479 | A1 | 7/2010 | Yamaguchi et al. |
| 2010/0166480 | A1 | 7/2010 | Yamaguchi et al. |
| 2010/0247205 | A1 | 9/2010 | Yamaguchi et al. |
| 2010/0247206 | A1 | 9/2010 | Yamaguchi et al. |
| 2010/0247208 | A1 | 9/2010 | Yamaguchi et al. |
| 2010/0247212 | A1 | 9/2010 | Yamaguchi et al. |
| 2010/0254742 | A1 | 10/2010 | Yamaguchi et al. |
| 2012/0080550 | A1 | 4/2012 | Yamaguchi et al. |
| 2013/0236229 | A1 | 9/2013 | Terry et al. |
| 2015/0124037 | A1 | 5/2015 | Terry et al. |
| 2015/0283835 | A1 | 10/2015 | Sakano et al. |
| 2017/0008323 | A1 | 1/2017 | Sakano et al. |
| 2018/0015759 | A1 | 1/2018 | Tonishi et al. |
| 2018/0043714 | A1 | 2/2018 | Sakano et al. |
| 2019/0061375 | A1 | 2/2019 | Matsumoto |

FOREIGN PATENT DOCUMENTS

| | | | |
|---|---|---|---|
| CN | 102092201 | A | 6/2011 |
| CN | 103273748 | A | 9/2013 |
| CN | 106976326 | A | 7/2017 |
| CN | 108995405 | A | 12/2018 |
| EP | 0414544 | A2 | 2/1991 |
| GB | 2016411 | A | 9/1979 |
| JP | S50-36734 | B1 | 11/1975 |
| JP | S54-111914 | A | 9/1979 |
| JP | S58-141479 | A | 8/1983 |
| JP | S59-6460 | A | 1/1984 |
| JP | S59-95180 | A | 6/1984 |
| JP | S60-8072 | U | 1/1985 |
| JP | S60-9657 | U | 1/1985 |
| JP | S60-36255 | U | 3/1985 |
| JP | S60-46254 | U | 4/1985 |
| JP | S60-48456 | U | 4/1985 |
| JP | S60-188821 | A | 9/1985 |
| JP | S60-224571 | A | 11/1985 |
| JP | S61-27277 | A | 2/1986 |
| JP | S61-154877 | A | 7/1986 |
| JP | S62-103179 | A | 5/1987 |
| JP | S62-103179 | U | 5/1987 |
| JP | S63-156762 | U | 10/1988 |
| JP | H02-6173 | A | 1/1990 |
| JP | H02-9562 | U | 1/1990 |
| JP | H02-11379 | A | 1/1990 |
| JP | H02-11380 | A | 1/1990 |
| JP | H02-37568 | Y2 | 10/1990 |
| JP | H3-19744 | A | 1/1991 |
| JP | H03-97181 | A | 4/1991 |
| JP | H03-284973 | A | 12/1991 |
| JP | H04-152176 | A | 5/1992 |
| JP | H05-41834 | U | 6/1993 |
| JP | H05-53956 | A | 7/1993 |
| JP | H05-53956 | U | 7/1993 |
| JP | H07-9745 | A | 1/1995 |
| JP | H07-32710 | A | 2/1995 |
| JP | H07-276755 | A | 10/1995 |
| JP | H07-276757 | A | 10/1995 |
| JP | H08-183204 | A | 7/1996 |
| JP | H08-183230 | A | 7/1996 |
| JP | H08-183232 | A | 7/1996 |
| JP | H11-78187 | A | 3/1999 |
| JP | 2000-52628 | A | 2/2000 |
| JP | 2000-103149 | A | 4/2000 |
| JP | 2001-47713 | A | 2/2001 |
| JP | 2002-211092 | A | 7/2002 |
| JP | 2007-502221 | A | 2/2007 |
| JP | 2008-213880 | A | 9/2008 |
| JP | 2008-261968 | A | 10/2008 |
| JP | 2009-196804 | A | 9/2009 |
| JP | 2010-234772 | A | 10/2010 |
| JP | 2011-148167 | A | 8/2011 |
| JP | 2011-150007 | A | 8/2011 |
| JP | 2012-126141 | A | 7/2012 |
| JP | 2012-158175 | A | 8/2012 |
| JP | 2012-236307 | A | 12/2012 |
| JP | 2014-170142 | A | 9/2014 |
| JP | 2017-128026 | A | 7/2017 |
| WO | 2005/018944 | A1 | 3/2005 |
| WO | 2005/092631 | A1 | 10/2005 |
| WO | 2008/105528 | A1 | 9/2008 |

OTHER PUBLICATIONS

International Search Report for PCT/JP2020/034876 dated Nov. 24, 2020.
Office Action for the related Brazilian Patent Application No. 112022005957-4 dated Nov. 14, 2023.
Extended European Search Report for the related European Patent Application No. 20872840.2 dated Sep. 14, 2023.
Japanese Office Action for the related Japanese Patent Application No. 2023-199237 dated Aug. 20, 2024.
International Preliminary Report on Patentability and English language Written Opinion of the International Search Report for PCT/JP2020/034876 dated Apr. 5, 2022.

* cited by examiner

PRINTING CASSETTE WITH GEAR

CROSS-REFERENCE TO RELATED APPLICATION

This is a divisional application claiming priority under 35 U.S.C. 120 to U.S. patent application Ser. No. 17/702,725 filed on Mar. 23, 2022 which in turn is a continuation application of International Application No. PCT/JP2020/034876 filed on Sep. 15, 2020 which claims priority under 35 U.S.C. 119 to Japanese Patent Application No. 2019-178164 filed on Sep. 30, 2019. The entire contents of the earlier applications are incorporated herein by reference.

TECHNICAL FIELD

Aspects of the disclosure relate to a printing cassette and a printer.

BACKGROUND

In a printer that performs printing on a printing tape, replacement and resupply of a printing tape is performed by attachment and detachment of a cassette accommodating a printing tape to and from the printer.

SUMMARY

It is assumed that the above-described cassette is provided with a gear for transmitting a driving force to the inside of the cassette or a gear for transmitting a driving force from the cassette to the outside thereof. In a case where a portion of such a gear is exposed to the outside of a case of the cassette, the gear is easily damaged when the cassette is dropped and collides with a surface of a floor or somewhere.

Accordingly, aspects of the disclosure provide a printing cassette that may reduce damage to a gear that transmits a driving force.

In one or more aspects of the disclosure, a printing cassette may include: a case including a first case portion, a second case portion, and a third case portion; a first tape, at least a portion of which is accommodated in the third case portion; and a gear, a portion of which is accommodated in the second case portion and the other portion of which is located outside of the case, the gear being rotatable about a rotation axis parallel to a first direction.

The first case portion may have an outlet through which the first tape is discharged. The first case portion, the second case portion, and the third case portion may be disposed in an order of the first case portion, the second case portion, and the third case portion in the first direction.

In one or more aspects of the disclosure, a printer may include: a printing cassette; and a printer body on which the printing cassette is to be mounted. The printer body may include a driving force transmission portion that is to be engaged with the gear.

According to these configurations, the gear may be disposed at the second case portion sandwiched between the first case portion and the third case portion. Therefore, even if the printing cassette is dropped and a surface of the printing cassette extending perpendicular to the axial direction of the rotation axis of the gear collides with a surface of a floor or somewhere, the gear may be protected by the first case portion and the third case portion and damage to the gear is reduced.

DETAILED DESCRIPTION

1. First Illustrative Embodiment

1-1. Configuration

Figure 1A:
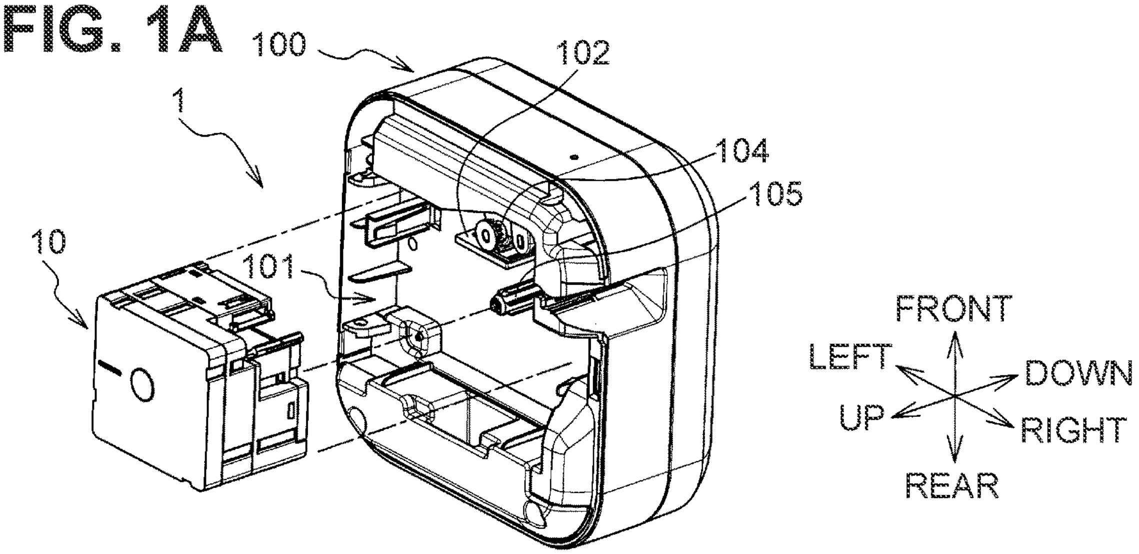
FIGS. 1A, 1B, and 1C are schematic perspective views each illustrating a state in which a printing cassette is detached from a printer body in a printer according to an illustrative embodiment.
Figure 1B:
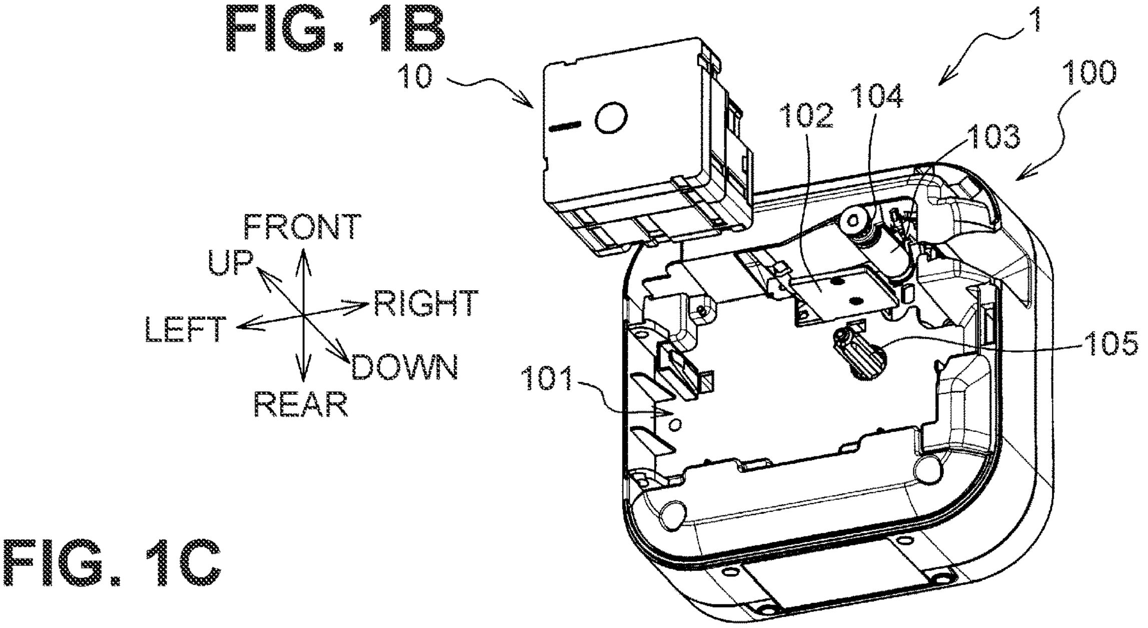
Figure 1C:
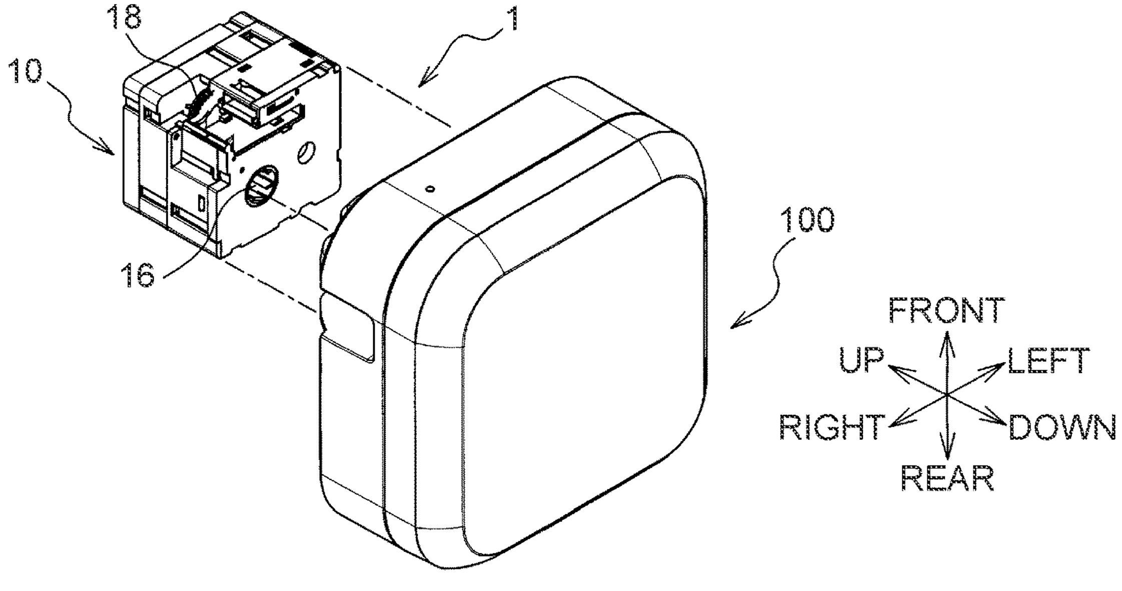

A printer 1 illustrated in FIGS. 1A, 1B, and 1C includes a printing cassette 10 and a printer body 100. The printer 1 is a device that performs printing on a tape-shaped printing medium.

In the illustrative embodiment, an axial direction of an output gear 18 is defined as an up-down direction. A direction that is perpendicular to the up-down direction and in which the output gear 18 and an input spool 16 are arranged next to each other is defined as a front-rear direction. A direction perpendicular to both the up-down direction and the front-rear direction is defined as a left-right direction.

<Printing Cassette>

The printing cassette 10 accommodates a printing medium. The printing cassette 10 is mountable to and removable from the printer body 100. Replacing the printing cassette 10 may achieve resupply of a printing medium and change of a type (e.g., color, material, or others) of the printing medium.

Figures 2A, 2B, 2C:
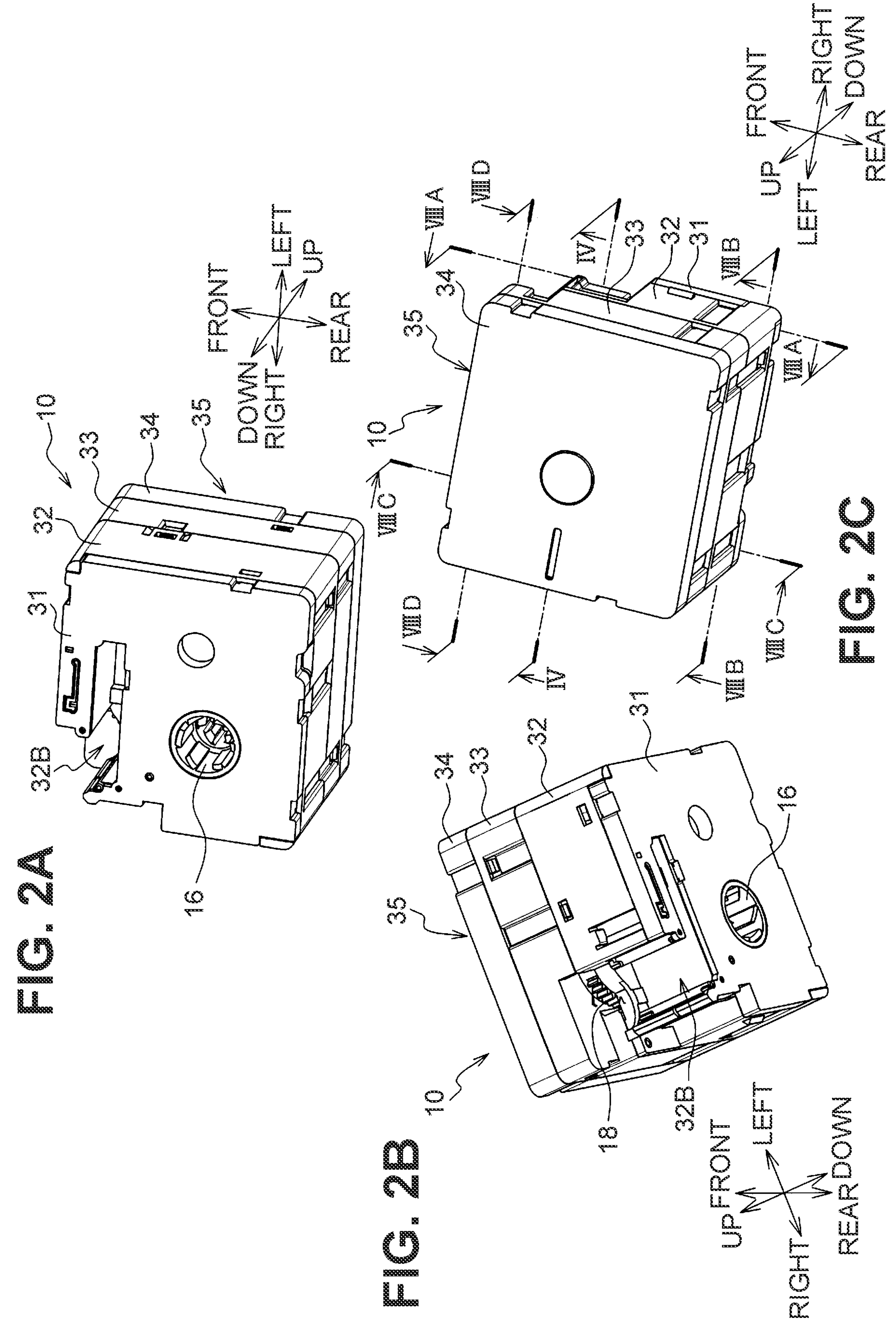
FIGS. 2A, 2B, and 2C are schematic perspective views each illustrating the printing cassette in the printer of FIG. 1A.

As illustrated in FIGS. 2A, 2B, and 2C, the printing cassette 10 includes a case 35 that accommodates a to-be-printed tape (an example of a first tape), an ink ribbon, and others. An outer shape of the printing cassette 10 (i.e., a shape of the case 35) is a rectangular parallelepiped having sides parallel to the up-down direction, sides parallel to the front-rear direction, and sides parallel to the left-right direction. The case 35 includes a first cover portion 31, a first frame portion 32, a second frame portion 33, and a second cover portion 34.

Figure 3:
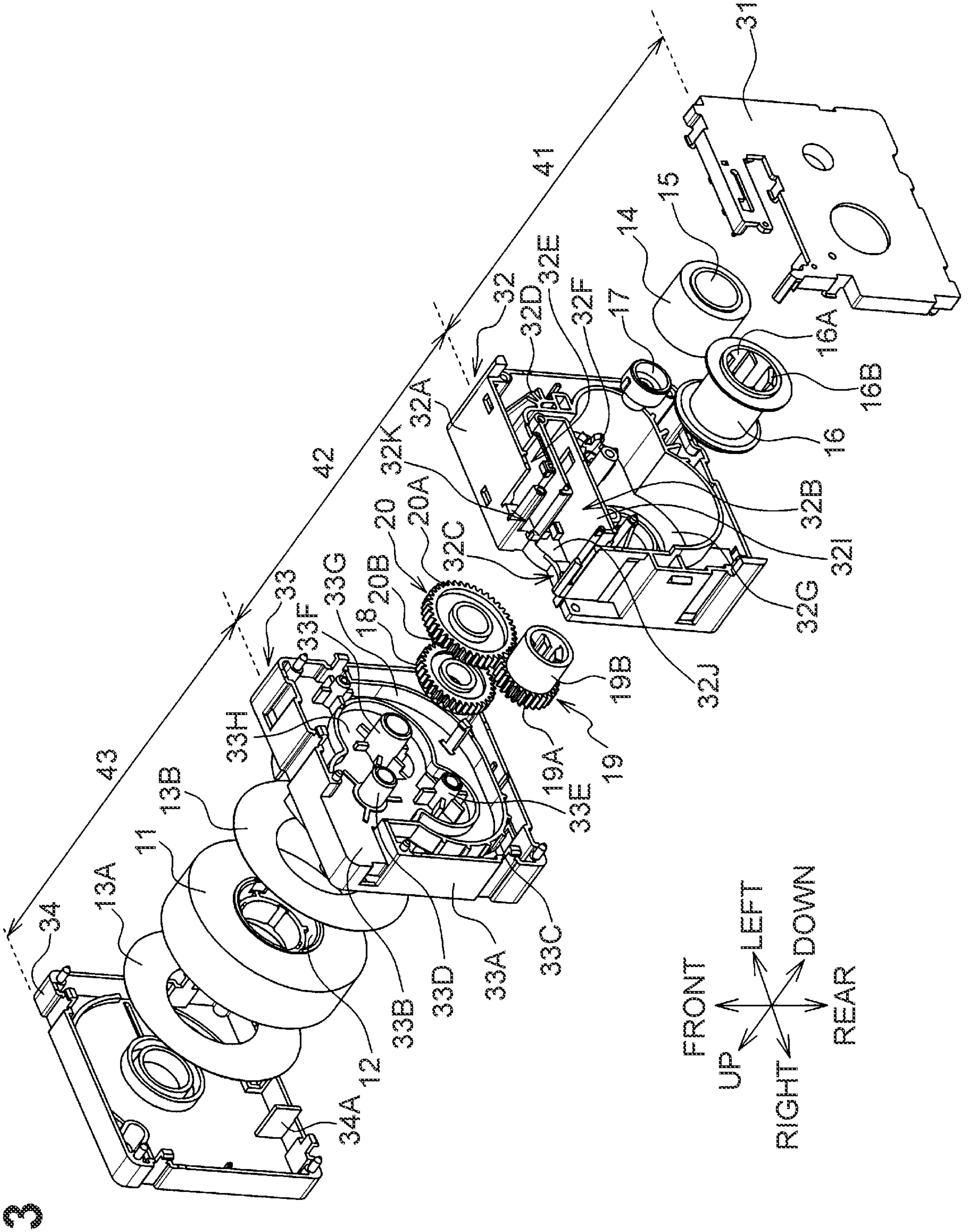
FIG. 3 is a disassembled schematic perspective view of the printing cassette of FIG. 2A.

As illustrated in FIG. 3, the printing cassette 10 includes a first roll 11, a first feed spool 12, a spacer film 13A, a spacer film 13B, a second roll 14, a second feed spool 15, an input spool 16, a clutch spring holder 17, the output gear 18, the input gear 19, and an idle gear 20.

(First Roll)

In the first roll 11, a to-be-printed tape on which printing is to be performed is wound around the first feed spool 12. Printing is performed on a surface of the to-be-printed tape by a print head 102 of the printer body 100 and an ink ribbon.

Two spacer films 13A, 13B are disposed outside the first roll 11 in the up-down direction such that the spacer films 13A, 13B sandwich the first roll 11 therebetween. The spacer film 13A is disposed between the first roll 11 and the second cover portion 34 The spacer film 13B is disposed between the first roll 11 and the second frame portion 33.

(First Feed Spool)

The first feed spool 12 is rotatable about its rotation axis. The first feed spool 12 rotates along with conveyance of the to-be-printed tape by a platen roller 103 of the printer body 100, thereby feeding the to-be-printed tape to the print head 102.

(Second Roll)

In the second roll 14, the ink ribbon used for printing on the to-be-printed tape is wound around the second feed spool 15.

In a head opening 32B, the ink ribbon is laid on the to-be-printed tape and used for printing performed by the print head 102 therein. The ink ribbon that has been used for printing is taken up by the input spool 16. A rotation resistance is applied to the second roll 14 by a clutch spring held by the clutch spring holder 17.

(Second Feed Spool)

The second feed spool 15 is rotatable about its rotation axis. The rotation axis of the second feed spool 15 is parallel to the rotational axis of the first feed spool 12, that is, parallel to the up-down direction.

The second feed spool 15 rotates along with take-up of the ink ribbon by the input spool 16, thereby feeding the ink ribbon to the print head 102. Further, the second feed spool 15 is disposed such that a portion thereof overlaps the first roll 11 in the up-down direction.

(Input Spool)

The input spool 16 is rotatable about its rotation axis. The rotation axis of the input spool 16 is parallel to the rotation axis of the second feed spool 15.

The input spool 16 has a cylindrical shape and has a hollow portion defined by an inner peripheral surface 16A. Spline teeth 16B are provided on the inner peripheral surface 16A of the input spool 16. A drive shaft 105 of the printer body 100 is to be coupled to the spline teeth 16B. The input spool 16 is rotated by the drive shaft 105 to take up the ink ribbon.

(Output Gear)

The output gear 18 is a single gear for outputting, to the outside, a driving force for conveying the to-be-printed tape. The output gear 18 transmits a driving force to the platen roller 103 via a platen gear 104 of the printer body 100.

The output gear 18 includes a disk that rotates about its rotation axis parallel to the up-down direction and teeth on a surface of the disk extending parallel to the up-down direction. One (i.e., an upper surface) of surfaces of the disk extending perpendicular to the up-down direction faces a cover portion 33B of the case 35 in the up-down direction. A portion of the other (i.e., a lower surface) of the surfaces of the disk extending perpendicular to the up-down direction does not face the case 35 in the up-down direction.

The output gear 18 is partially exposed to the head opening 32B, and thus, the exposed portion thereof is located outside the case 35. The output gear 18 is in engagement with the platen gear 104 at the head opening 32B in a state where the printing cassette 10 is mounted on the printer body 100.

Figure 4:
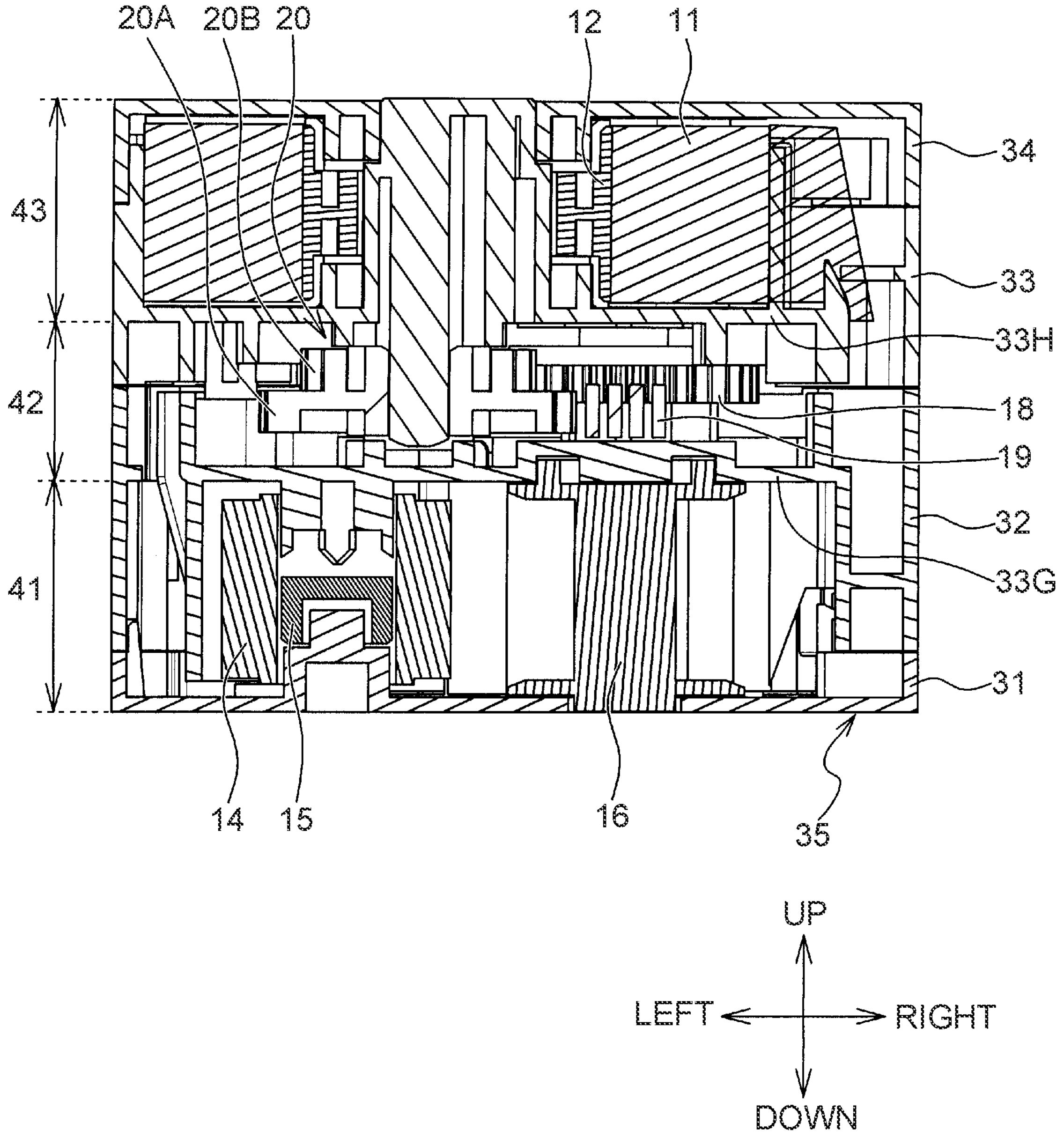
FIG. 4 is a schematic cross-sectional view taken along line IV-IV of FIG. 2C.

As illustrated in FIG. 4, the first roll 11, the output gear 18, and the second roll 14 (i.e., the second feed spool 15) are disposed in the order of the first roll 11, the output gear 18, and the second roll 14 in the up-down direction. That is, the output gear 18 is positioned between the first roll 11 and the second roll 14 in the up-down direction.

(Input Gear)

As illustrated in FIG. 3, the input gear 19 is indirectly connected to the output gear 18 via an idle gear 20 and transmits a driving force to the output gear 18. A driving force from a driving source of the printer body 100 is input to the input gear 19.

The input gear 19 includes an external gear 19A and a cylindrical spool 19B fixed to a lower surface of the external gear 19A and having spline teeth on an inner peripheral surface thereof. The external gear 19A rotates integrally with the spool 19B by the driving force input to the spool 19B.

A rotation axis of the input gear 19 (i.e., a rotation axis of the external gear 19A and a rotation axis of the spool 19B) is coaxial with the rotation axis of the input spool 16. As illustrated in FIG. 4, the input spool 16, the input gear 19, and the first roll 11 are disposed in the order of the input spool 16, the input gear 19, and the first roll 11 in the up-down direction.

That is, the input gear 19 is positioned between the input spool 16 and the first roll 11 in the up-down direction. Further, the input gear 19 is disposed such that a portion thereof overlaps the first roll 11 in the up-down direction.

The rotation axis of the input gear 19 extends in the hollow portion of the input spool 16. That is, the drive shaft 105 is inserted into the input spool 16 and the input gear 19 simultaneously. As a result, although the input gear 19 is not directly coupled to the input spool 16, the input gear 19 is rotated by a driving source (i.e., the drive shaft 105) common to the input spool 16.

(Idle Gear)

The idle gear 20 is connected to be driven to (i.e., is in engagement with) the input gear 19 and the output gear 18, and transmits the driving force input to the input gear 19 to the output gear 18.

The idle gear 20 is a stepped gear in which a first gear 20A engaged with the input gear 19 and a second gear 20B engaged with the output gear 18 are arranged coaxially. The second gear 20B has a diameter smaller than the first gear 20A. Further, the second gear 20B is disposed at a position closer to the first roll 11 than the second gear 20B to the first gear 20A in the up-down direction (i.e., on an upper side). The idle gear 20 constitutes a deceleration mechanism that decelerates the driving force input to the input gear 19.

(Case)

As illustrated in FIG. 3, the first cover portion 31 serves as a lower end portion of the printing cassette 10. The first frame portion 32 is disposed above the first cover portion 31 and is connected to the first cover portion 31 in the up-down direction. The second frame portion 33 is disposed above the first frame portion 32 and is connected to the first frame portion 32 in the up-down direction. The second cover portion 34 serves as an upper end portion of the printing cassette 10. The second cover portion 34 is connected to the second frame portion 33 in the up-down direction.

The first cover portion 31 and a first portion that is a lower side of the first frame portion 32 constitute a first case portion 41 in which the second roll 14 (i.e., at least a portion of the ink ribbon), the second feed spool 15, and the input spool 16 are accommodated. That is, the second roll 14, the second feed spool 15, and the input spool 16 are disposed in a space surrounded by the first cover portion 31 and the first frame portion 32. The first case portion 41 is further provided with an outlet 32C through which the to-be-printed tape is discharged.

A second portion of the first frame portion 32 that is a side (i.e., an upper side) opposite to the first portion in the up-down direction and a third portion that is a lower side of the second frame portion 33 constitute a second case portion 42 in which a particular portion of the output gear 18, the input gear 19, and the idle gear 20 are accommodated. That is, the particular portion of the output gear 18, the input gear 19, and the idle gear 20 are disposed in a space surrounded by the first frame portion 32 and the second frame portion 33.

A fourth portion of the second frame portion 33 that is a side (i.e., an upper side) opposite to the third portion in the up-down direction and the second cover portion 34 constitute a third case portion 43 in which the first roll 11 (i.e., at least a portion of the to-be-printed tape) is accommodated. That is, the first roll 11 is disposed in a space surrounded by the second frame portion 33 and the second cover portion 34.

As illustrated in FIG. 4, the first case portion 41, the second case portion 42, and the third case portion 43 are disposed in the order of the first case portion 41, the second case portion 42, and the third case portion 43 in the up-down direction. That is, the second case portion 42 is disposed between the first case portion 41 and the third case portion 43 in the up-down direction.

A dimension of the first case portion 41 in the up-down direction and a dimension of the third case portion 43 in the up-down direction are both greater than a dimension of the second case portion 42 in the up-down direction. Further, the dimension of the first case portion 41 in the up-down direction is greater than or equal to the dimension of the third case portion 43 in the up-down direction. A dimension of the second frame portion 33 in the up-down direction is greater than a dimension of the first frame portion 32 in the up-down direction.

Figure 5A:
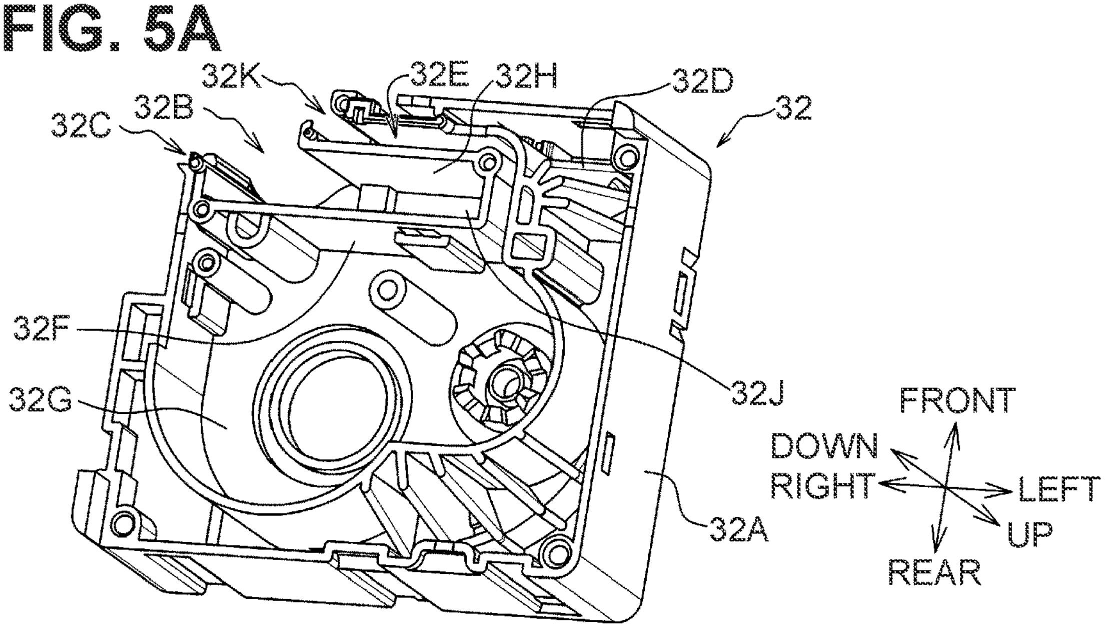
FIGS. 5A and 5B are schematic perspective views each illustrating a first frame portion of the printing cassette of FIG. 2A.
Figure 5B:
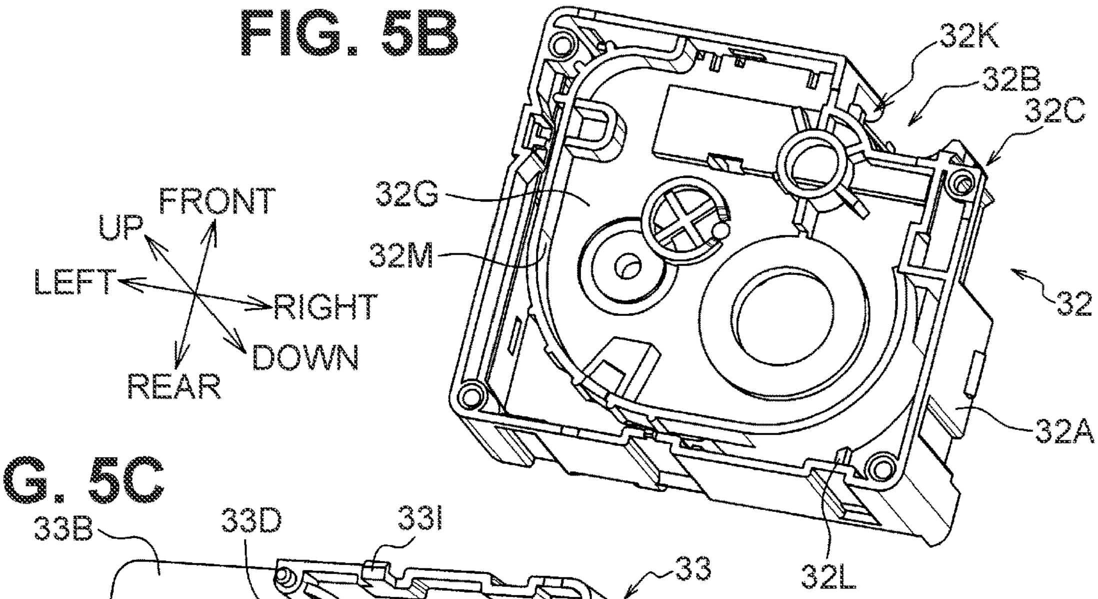

As illustrated in FIGS. 5A and 5B, the first frame portion 32 includes a first sidewall 32A, the head opening 32B, the outlet 32C, a first guide 32D, a protruding portion 32E, a facing portion 32F, a first separation wall 32G, an outlet for opening 32K, a first restricting portion 32L, and a first partition wall 32M. The first sidewall 32A defines side surfaces of the printing cassette 10. The side surfaces of the printing cassette 10 extend parallel to the up-down direction.

The head opening 32B is a cutaway portion of the first sidewall 32A. The head opening 32B is a space in which the print head 102 is located by insertion into the head opening 32B from below in a state where the printing cassette 10 is mounted to the printer body 100. The head opening 32B opens downward in the printing cassette 10.

The first guide 32D is a portion around which a to-be-printed tape 11A fed from the third case portion 43 is wound. The first guide 32D has a plurality of ribs being plates that are apart from each other in a circumferential direction of the second roll 14. The plurality of ribs protrude in a radial direction of the second roll 14, and a protruding amount of each of the plurality of ribs (i.e., a plate width) decreases as each of the plurality of ribs extends downward.

The protruding portion 32E is located upstream from the head opening 32B in a conveyance direction of the to-be-printed tape, and is a portion in which the to-be-printed tape and the ink ribbon are conveyed parallel to each other. The protruding portion 32E extends in the left-right direction. The to-be-printed tape and the ink ribbon are conveyed inside the protruding portion 32E from left to right during printing.

The protruding portion 32E has a first surface 32H that defines the head opening 32B. The first surface 32H serves as a rear surface of the protruding portion 32E and is orthogonal to the front-rear direction. In a state where the printing cassette 10 is mounted on the printer body 100, the first surface 32H faces the print head 102 in the front-rear direction.

The facing portion 32F is a plate portion facing the protruding portion 32E in the front-rear direction. The facing portion 32F separates the head opening 32B and a space in which the second roll 14, the second feed spool 15, and the input spool 16 are disposed in the front-rear direction. The facing portion 32F defines the head opening 32B and has a second surface 32I (refer to FIG. 3) facing the first surface 32H in the front-rear direction.

The second surface 32I serves as a front surface of the facing portion 32F and is orthogonal to the front-rear direction. In a state where the printing cassette 10 is mounted on the printer body 100, the second surface 32I is opposite to the first surface 32H with respect to the print head 102 in the front-rear direction.

The first separation wall 32G separates the first case portion 41 and the second case portion 42 in the up-down direction. The first separation wall 32G is a portion of the second case portion 42. That is, in the first frame portion 32, the first portion constituting the first case portion 41 is a portion lower than the first separation wall 32G. On the other hand, the protruding portion 32E and the facing portion 32F protrude downward from the first separation wall 32G. Thus, the protruding portion 32E and the facing portion 32F are portions of the first case portion 41.

The first separation wall 32G has a third surface 32J that is disposed at an upper end of the head opening 32B in the up-down direction and connects between the protruding portion 32E and the facing portion 32F. The third surface 32J serves as a lower surface of the first separation wall 32G and is orthogonal to the up-down direction.

The outlet for opening 32K is a portion through which the to-be-printed tape that travels in the protruding portion 32E is to be discharged to the head opening 32B. The outlet for opening 32K is provided at a right end of the protruding portion 32E. The ink ribbon drawn from the second roll 14 is laid on the to-be-printed tape discharged from the outlet for opening 32K to the head opening 32B.

The first restricting portion 32L restricts movement of the to-be-printed tape in a width direction of the to-be-printed tape. The first restricting portion 32L is disposed between both ends (i.e., an upper end and a lower end) of the outlet 32C in the width direction of the to-be-printed tape (i.e., the up-down direction) in the first case portion 41 (refer to FIG. 8B). Specifically, the first restricting portion 32L protrudes further upward from a support portion 32N protruding leftward from the first sidewall 32A at a right rear portion of the first frame portion 32.

The first partition wall 32M separates a space in which the output gear 18, the input gear 19, and the idle gear 20 are disposed and a space through which the to-be-printed tape travels. Specifically, in the second frame portion 33, the first partition wall 32M separates an inner area where the output gear 18, the input gear 19, and the idle gear 20 are disposed and an outer area that is more outside than the inner area.

Figure 5C:
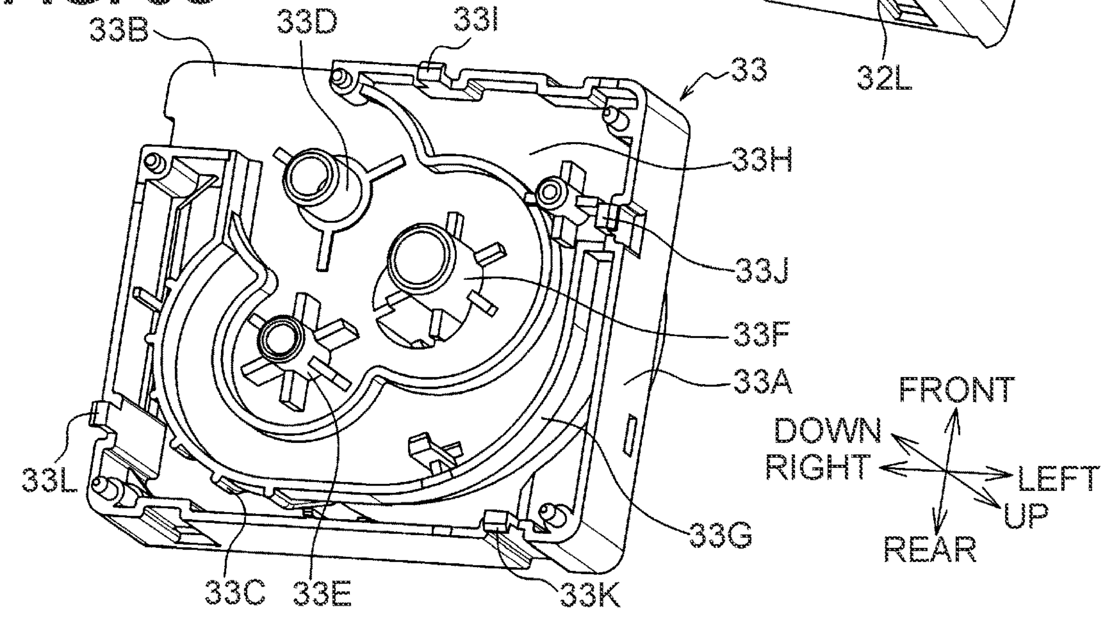
FIG. 5C is a schematic perspective view of a second frame portion of the printing cassette of FIG. 2A.
Figure 8A:
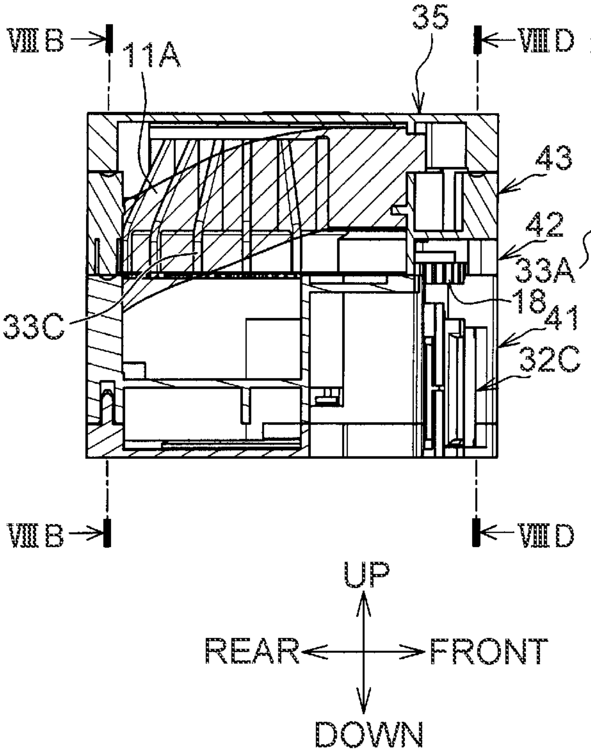
FIG. 8A is a schematic cross-sectional view taken along line VIIIA-VIIIA of FIG. 2C.
Figure 8B:
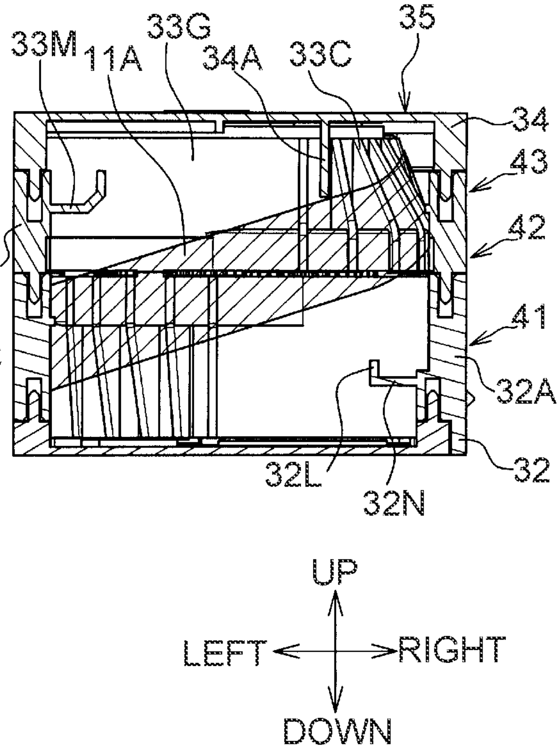
FIG. 8B is a schematic cross-sectional view taken along line VIIIB-VIIIB of FIG. 2C.

As illustrated in FIG. 5C, the second frame portion 33 includes a second sidewall 33A, a cover portion 33B, a second guide 33C, a first gear support portion 33D, a second gear support portion 33E, a third gear support portion 33F, a second partition wall 33G, a second separation wall 33H, a first claw 33I, a second claw 33J, a third claw 33K, a fourth claw 33L, and a second restricting portion 33M (refer to FIG. 8B). The second sidewall 33A defines side surfaces of the printing cassette 10. The side surfaces of the printing cassette 10 extend parallel to the up-down direction.

The cover portion 33B has surfaces perpendicular to the up-down direction. The cover portion 33B is disposed at a position where the cover portion 33B overlaps the output gear 18 in the up-down direction. In the illustrative embodiment, the cover portion 33B is contiguous with a lower end portion of the second sidewall 33A, and is disposed at a right front corner of the second frame portion 33.

The output gear 18, the cover portion 33B, and the first roll 11 are arranged next to each other in the order of the output gear 18, the cover portion 33B, and the first roll 11 in the up-down direction. As described above, an upper surface of the output gear 18 is entirely covered by the cover portion 33B.

Figure 6:
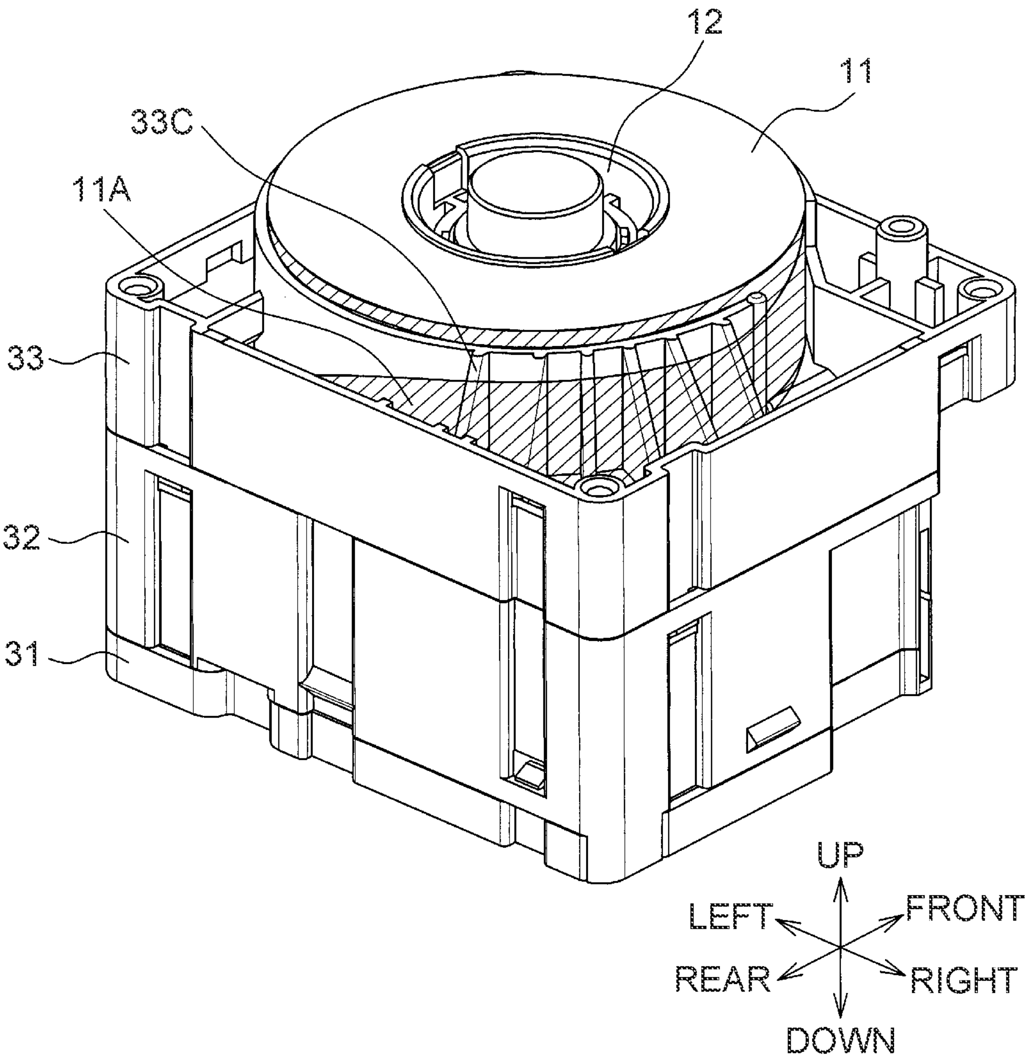
FIG. 6 is a schematic perspective view illustrating a state in which a first cover portion of the printing cassette of FIG. 2A is removed.

As illustrated in FIG. 6, the second guide 33C is a portion around which the to-be-printed tape 11A drawn from the first roll 11 is wound. The second guide 33C has a plurality of ribs being plates that are apart from each other in a circumferential direction of the first roll 11. The plurality of ribs protrude in a radial direction of the first roll 11, and a protruding amount of each of the plurality of ribs (i.e., a plate width) increases as each of the plurality of ribs extends downward.

The first gear support portion 33D illustrated in FIG. 5C supports the output gear 18 rotatably. The second gear support portion 33E supports the input gear 19 rotatably. The third gear support portion 33F supports the idle gear 20 rotatably.

The second partition wall 33G separates a space in which the output gear 18, the input gear 19, and the idle gear 20 are disposed and a space through which the to-be-printed tape travels. Specifically, in the second frame portion 33, the second partition wall 33G separates an inner area where the first gear support portion 33D, the second gear support portion 33E, and the third gear support portion 33F are disposed and an outer area in which the second guide 33C is disposed. The second guide 33C protrudes from the second partition wall 33G.

The second separation wall 33H separates the second case portion 42 and the third case portion 43 in the up-down direction. The second separation wall 33H is a portion of the third case portion 43. That is, in the second frame portion 33, the third portion constituting the second case portion 42 is a portion lower than the second separation wall 33H.

On the other hand, the first gear support portion 33D, the second gear support portion 33E, the third gear support portion 33F, and the second partition wall 33G protrude downward from the second separation wall 33H. Therefore, the first gear support portion 33D, the second gear support portion 33E, the third gear support portion 33F, and the second partition wall 33G are portions of the second case portion 42.

The first claw 33I is disposed at a front end portion of the second frame portion 33. The second claw 33J is disposed at a left end portion of the second frame portion 33. The third claw 33K is disposed at a rear end portion of the second frame portion 33. The fourth claw 33L is disposed at a right end portion of the second frame portion 33.

Each of the claws 33I, 33J, 33K, and 33L protrudes downward and engages a corresponding opening or groove defined in the first sidewall 32A of the first frame portion 32. That is, the claws 33I, 33J, 33K, 33L connect between the first frame portion 32 and the second frame portion 33 in the up-down direction.

The output gear 18, the input gear 19, and the idle gear 20 are disposed between the first claw 33I and the third claw 33K in the front-rear direction and between the second claw 33J and the fourth claw 33L in the right-left direction.

As illustrated in FIG. 8B, the second restricting portion 33M restricts movement of the to-be-printed tape in the width direction of the to-be-printed tape. The second restricting portion 33M protrudes rightward from the second sidewall 33A at a left rear portion of the second frame portion 33.

The second cover portion 34 illustrated in FIG. 3 has a third restricting portion 34A that restricts movement of the to-be-printed tape in the width direction. The third restricting portion 34A is disposed between both ends (i.e., an upper end and a lower end) of the first roll 11 in the width direction of the to-be-printed tape (i.e., the up-down direction) in the third case portion 43 (refer to FIG. 8B). Specifically, the third restricting portion 34A is a plate member disposed at a right rear portion of the second cover portion 34 such that a thickness direction of the third restricting portion 34A is parallel to the right-left direction.

A volume of an internal space of the third case portion 43 is greater than a volume of an internal space of the first case portion 41. A total weight of the third case portion 43 and the components (i.e., the first roll 11, the first feed spool 12, and others) accommodated in the third case portion 43 is greater than a total weight of the first case portion 41 and the components (i.e., the second roll 14, the second feed spool 15, the input spool 16, and others) accommodated in the first case portion 41.

Figure 7:
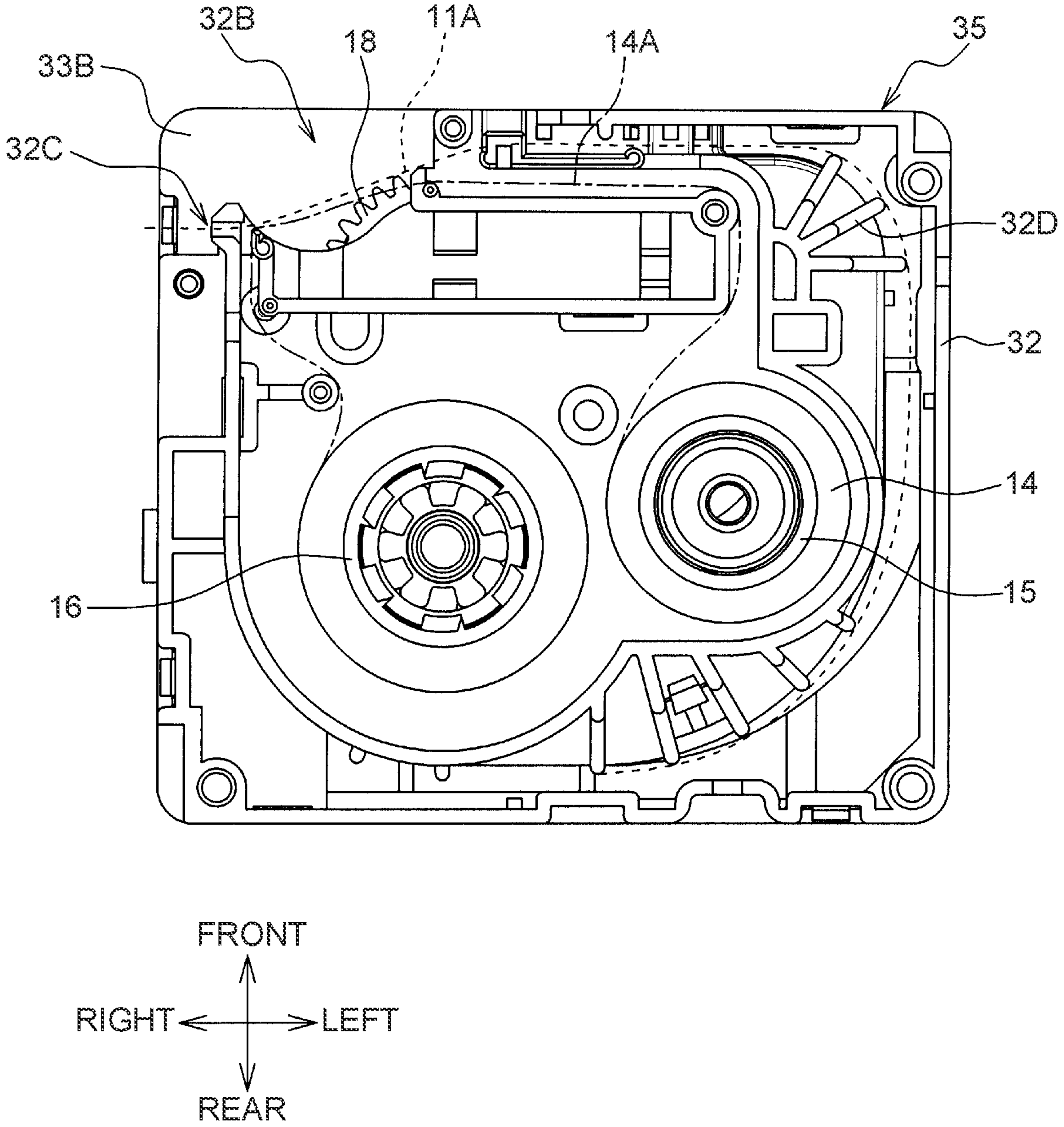
FIG. 7 is a perspective view for explaining a path of a to-be-printed tape and a path of an ink ribbon in the printing cassette of FIG. 2A.

As illustrated in FIG. 7, the to-be-printed tape 11A and the ink ribbon 14A extend across the head opening 32B in the right-left direction. The to-be-printed tape 11A on which printing has been performed is discharged to the outside of the printer 1 from the outlet 32C.

In a projection drawing in which the output gear 18 and the case 35 are projected onto a virtual plane perpendicular to the up-down direction, the output gear 18 is located inside an outer edge of the case 35. The entire output gear 18 overlaps the case 35 in the up-down direction.

As illustrated in FIGS. 8A, 8B, 8C, and 8D, the first guide 32D and the second guide 33C define a path through which the to-be-printed tape 11A constituting the first roll 11 is fed from the third case portion 43 to the first case portion 41.

Specifically, as illustrated in FIG. 8A, the to-be-printed tape 11A drawn from the first roll 11 is conveyed in a spiral manner toward the lower rear in the third case portion 43 while contacting the second guide 33C from an outer side in the radial direction of the first roll 11. As illustrated in FIG. 8B, the to-be-printed tape 11A is further conveyed toward the lower left while extending across the second case portion 42 in the up-down direction.

Figure 8C:
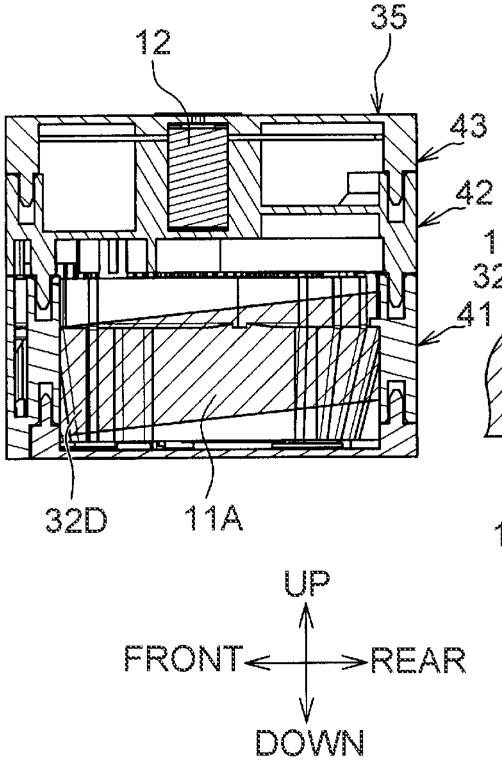
FIG. 8C is a schematic cross-sectional view taken along line VIIIC-VIIIC of FIG. 2C.
Figure 8D:
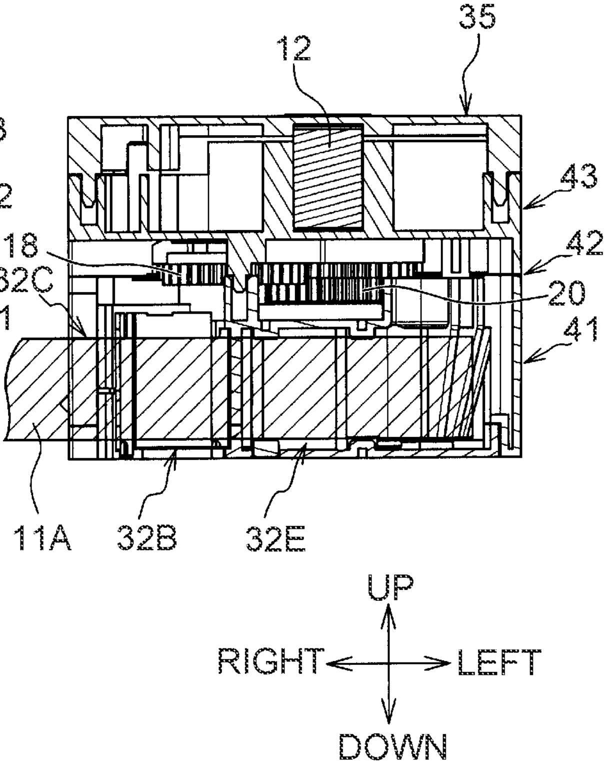
FIG. 8D is a schematic cross-sectional view taken along line VIIID-VIIID of FIG. 2C.

As illustrated in FIG. 8C, the to-be-printed tape 11A that has passed the second case portion 42 and reached the first case portion 41 is conveyed toward the lower front with contacting the first guide 32D from the outer side in the radial direction. As illustrated in FIG. 8D, the to-be-printed tape 11A that has passed the first case portion 41 and reached the lower end portion of the printing cassette 10 passes the head opening 32B and is then discharged from the outlet 32C.

<Printer Body>

As illustrated in FIG. 1B, the printer body 100 includes a cassette insertion portion 101, the print head 102, the platen roller 103, the platen gear 104, and the drive shaft 105.

(Cassette Insertion Portion)

The cassette insertion portion 101 is a recessed portion on which the printing cassette 10 is to be mounted. The cassette insertion portion 101 has a function of positioning the printing cassette 10.

(Print Head)

The print head 102 is a device for performing printing on the to-be-printed tape held by the printing cassette 10.

The print head 102 is disposed in the cassette insertion portion 101. The print head 102 is disposed such that, in a state where the printing cassette 10 is mounted on the printer body 100, the print head 102 overlaps the to-be-printed tape and the ink ribbon in the front-rear direction at the head opening 32B.

The print head 102 has a plurality of heating elements, heat generation of which are individually controlled. The to-be-printed tape that has been conveyed to the head opening 32B by the platen roller 103 is pressed toward the print head 102 in which the heating elements have generated heat, via the ink ribbon. Thus, some ink on a particular surface of the ink ribbon is transferred onto the to-be-printed tape, and characters, symbols, and other representations are printed on the to-be-printed tape.

(Platen Roller)

The platen roller 103 is a roller for conveying the to-be-printed tape from the inside to the outside of the printing cassette 10. A rotation axis of the platen roller 103 is parallel to the up-down direction.

The platen roller 103 is disposed adjacent to the print head 102 in the cassette insertion portion 101. The platen roller 103 contacts and presses the to-be-printed tape toward the print head 102 at the head opening 32B.

(Platen Gear)

The platen gear 104 is a driving force transmission portion that is connected to be driven to the platen roller 103 and is to be engaged with the output gear 18. In the illustrative embodiment, a rotation axis of the platen gear 104 is coaxial with the rotation axis of the platen roller 103.

Figure 9:
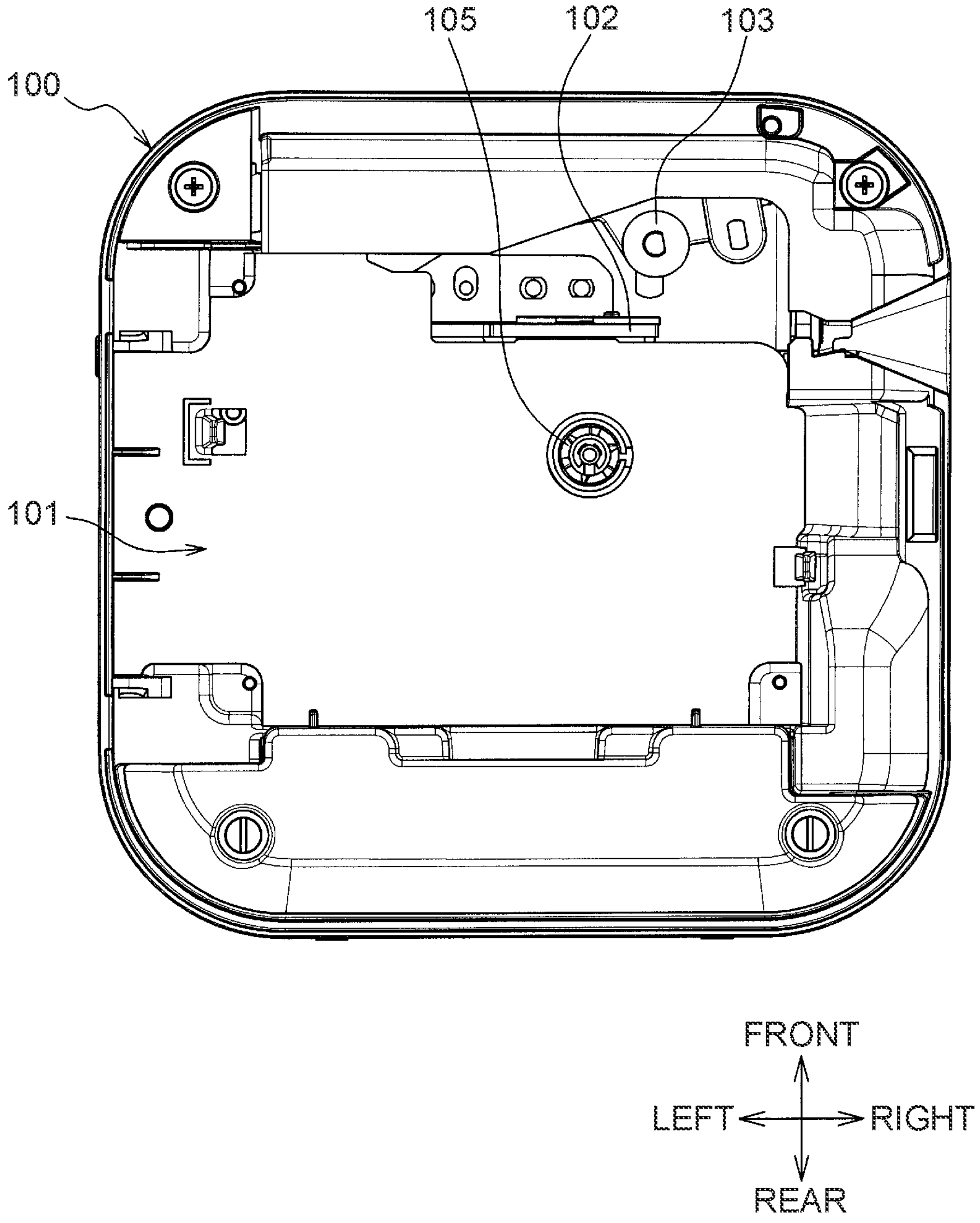
FIG. 9 is a schematic plan view illustrating the printer body of the printer of FIG. 1A.
Figure 10:
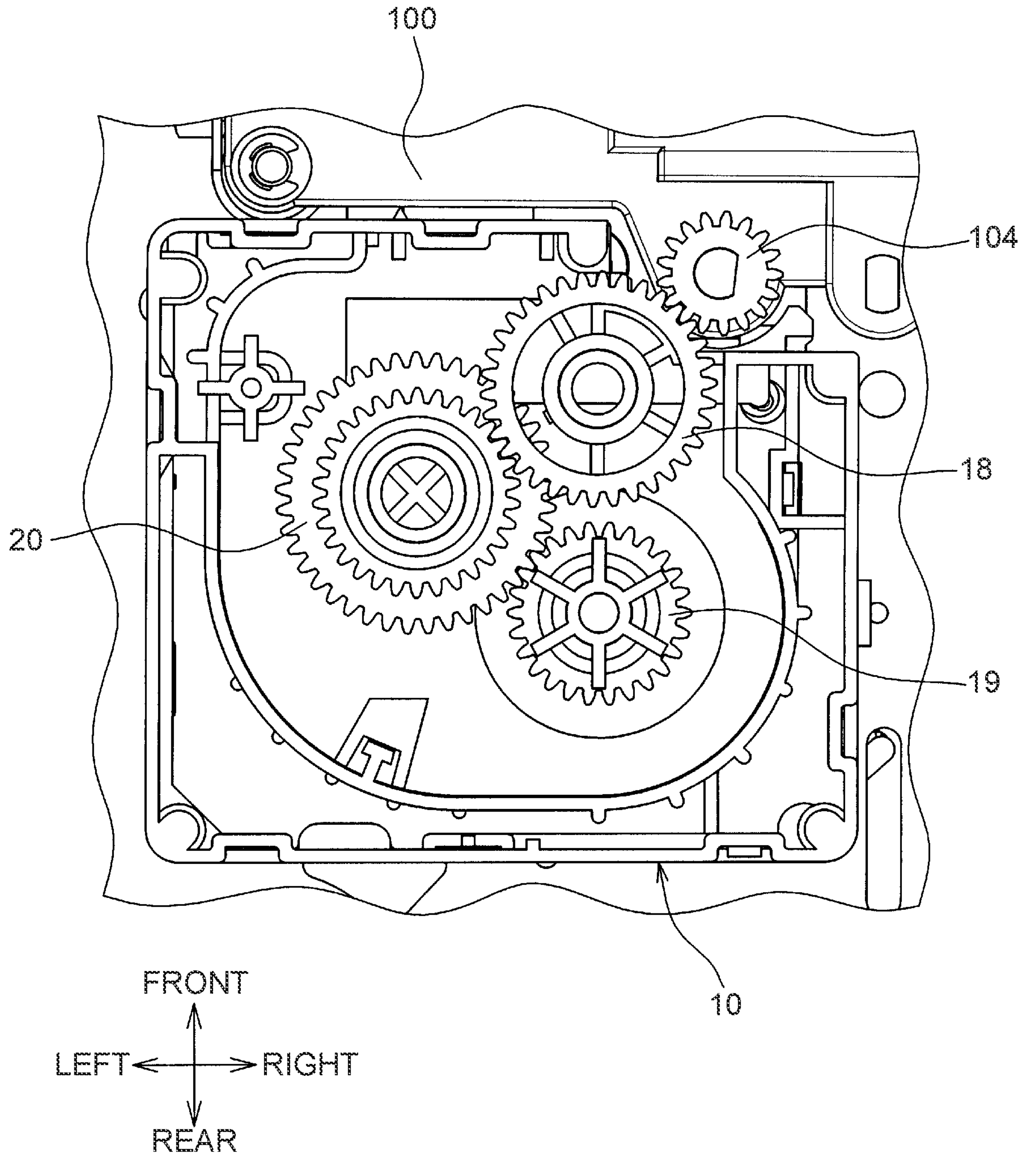
FIG. 10 is a schematic view illustrating a state in which an output gear and a platen gear are in engagement with each other in the printer of FIG. 1A.

The platen roller 103 and the platen gear 104 are swingable between a position illustrated in FIG. 9 where the platen roller 103 and the platen gear 104 are spaced from the printing cassette 10 and a position illustrated in FIG. 10 where the platen gear 104 is in engagement with the output gear 18.

(Drive Shaft)

The drive shaft 105 is a shaft that is engaged with the input gear 19 when the drive shaft 105 is inserted into the input spool 16, and that rotates the input spool 16 and the input gear 19.

The drive shaft 105 is disposed in the cassette insertion portion 101. A rotation axis of the drive shaft 105 is parallel to the up-down direction. The drive shaft 105 rotates about its rotation axis by a driving source (e.g., a motor).

As illustrated in FIG. 10, in a state where the printing cassette 10 is mounted on the printer body 100, the drive shaft 105 is in engagement with the input gear 19 and the platen gear 104 is in engagement with the output gear 18. Specifically, the drive shaft 105 is inserted into the input spool 16 and the input gear 19 of the printing cassette 10, and the platen roller 103 and the platen gear 104 are swung toward the head opening 32B of the printing cassette 10, whereby the printing cassette 10 is mounted on the printer body 100.

As the input gear 19 is rotated by the drive shaft 105 in a state where the printing cassette 10 is mounted, the output gear 18 is rotated, the platen gear 104 is rotated by the rotation of the output gear 18, and the platen roller 103 is rotated by the rotation of the platen gear 104.

1-2. Effects

According to the illustrative embodiment described in detail above, the following effects may be obtained.

(1a) The output gear 18 is disposed at the second case portion 42 sandwiched between the first case portion 41 and the third case portion 43. Therefore, even if the printing cassette 10 is dropped and the surface of the printing cassette 10 extending perpendicular to the axial direction of the rotation axis of the output gear 18 collides with a surface of a floor or somewhere, the output gear 18 is protected by the first case portion 41 and the third case portion 43 and damage to the output gear 18 is reduced.

(1b) The protruding portion 32E and the facing portion 32F are connected to each other by the third surface 32J. Thus, strength of the protruding portion 32E may be increased. As a result, damage to the protruding portion 32E when the printing cassette 10 is dropped is reduced.

(1c) The volume and total weight of the third case portion 43 is greater than the volume and total weight of the first case portion 41. Thus, even if the printing cassette 10 is dropped, the third case portion 43 faces down and is likely to collides with a surface of a floor surface or somewhere. Therefore, damage to the output gear 18 disposed at the first case portion 41 and exposed to the head opening 32B is reduced.

(1d) The case portions are partitioned by the respective separation walls. Thus, even if the printing cassette 10 is dropped, a collision between parts disposed at the different case portions is reduced. Therefore, damage to the parts is reduced.

(1e) The to-be-printed tape wound around the first feed spool 12 may be smoothly fed from the third case portion 43 to the first case portion 41 by the first restricting portion 32L, the second restricting portion 33M, and the third restricting portion 34A.

(1f) In the second case portion 42, the first partition wall 32M and the second partition wall 33G prevent the to-be-printed tape conveyed toward the outlet 32C from interfering with the output gear 18, the input gear 19, and the idle gear 20.

2. Second Illustrative Embodiment

2-1. Configuration

Figure 11A:
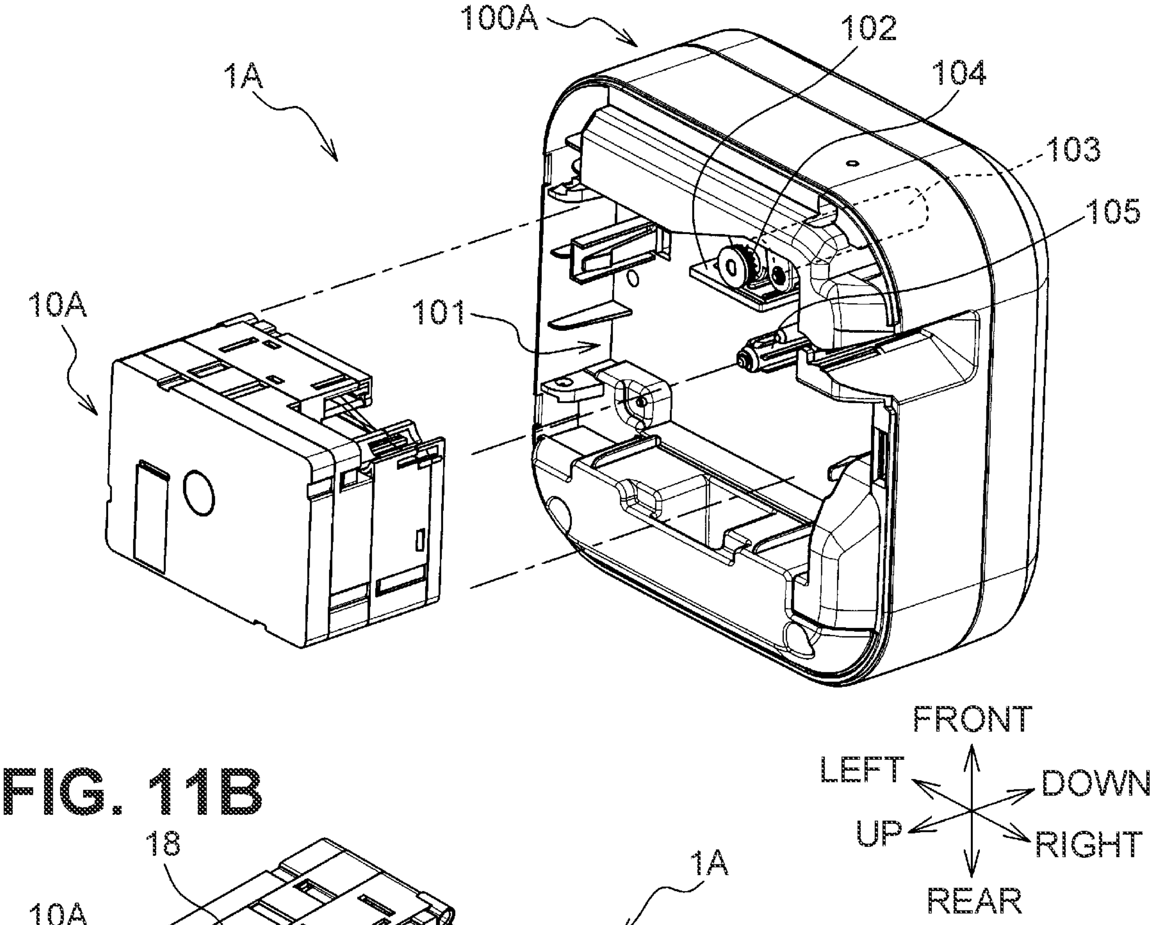
FIGS. 11A and 11B are schematic perspective views each illustrating a state in which a printing cassette is detached from a printer body in a printer according to an illustrative embodiment different from the illustrative embodiment illustrated in FIG. 1A.
Figure 11B:
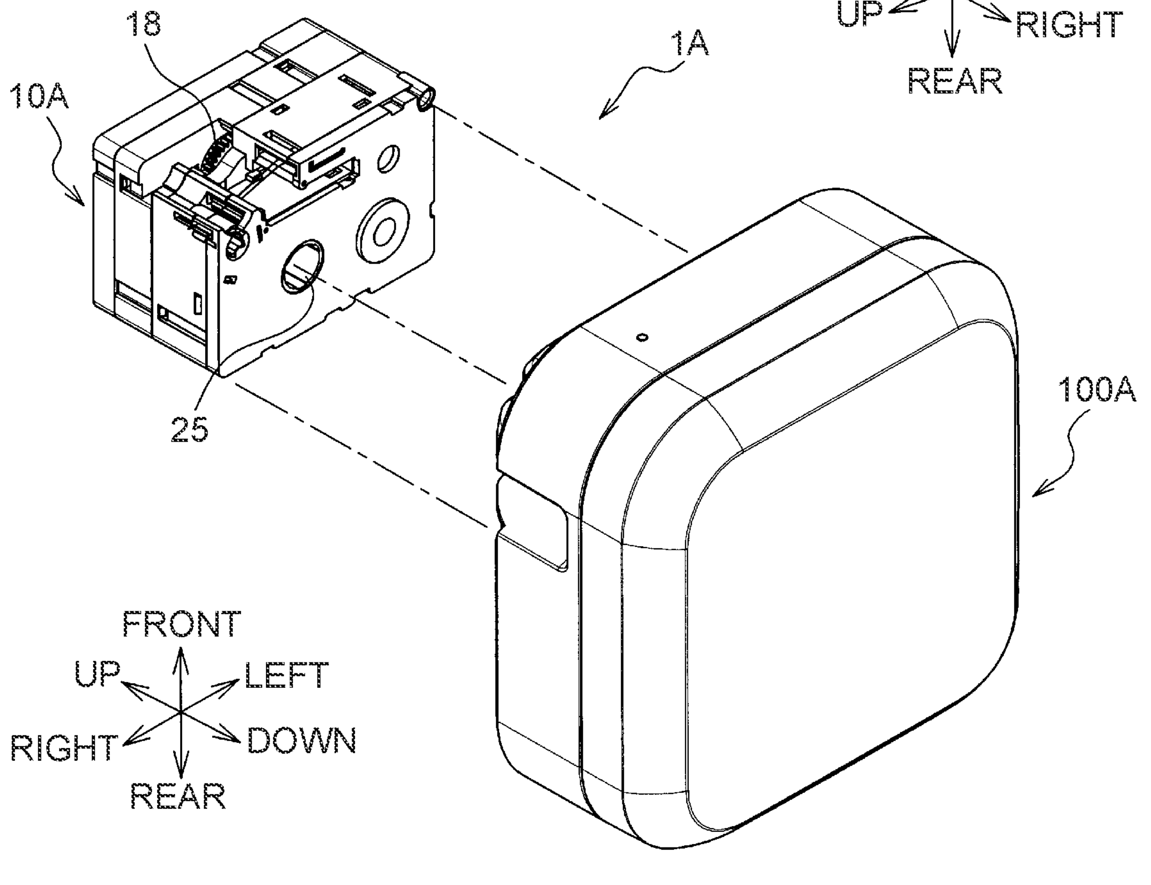

A printer 1A illustrated in FIGS. 11A and 11B includes a printing cassette 10A and a printer body 100A.

<Printing Cassette>

Figure 12:
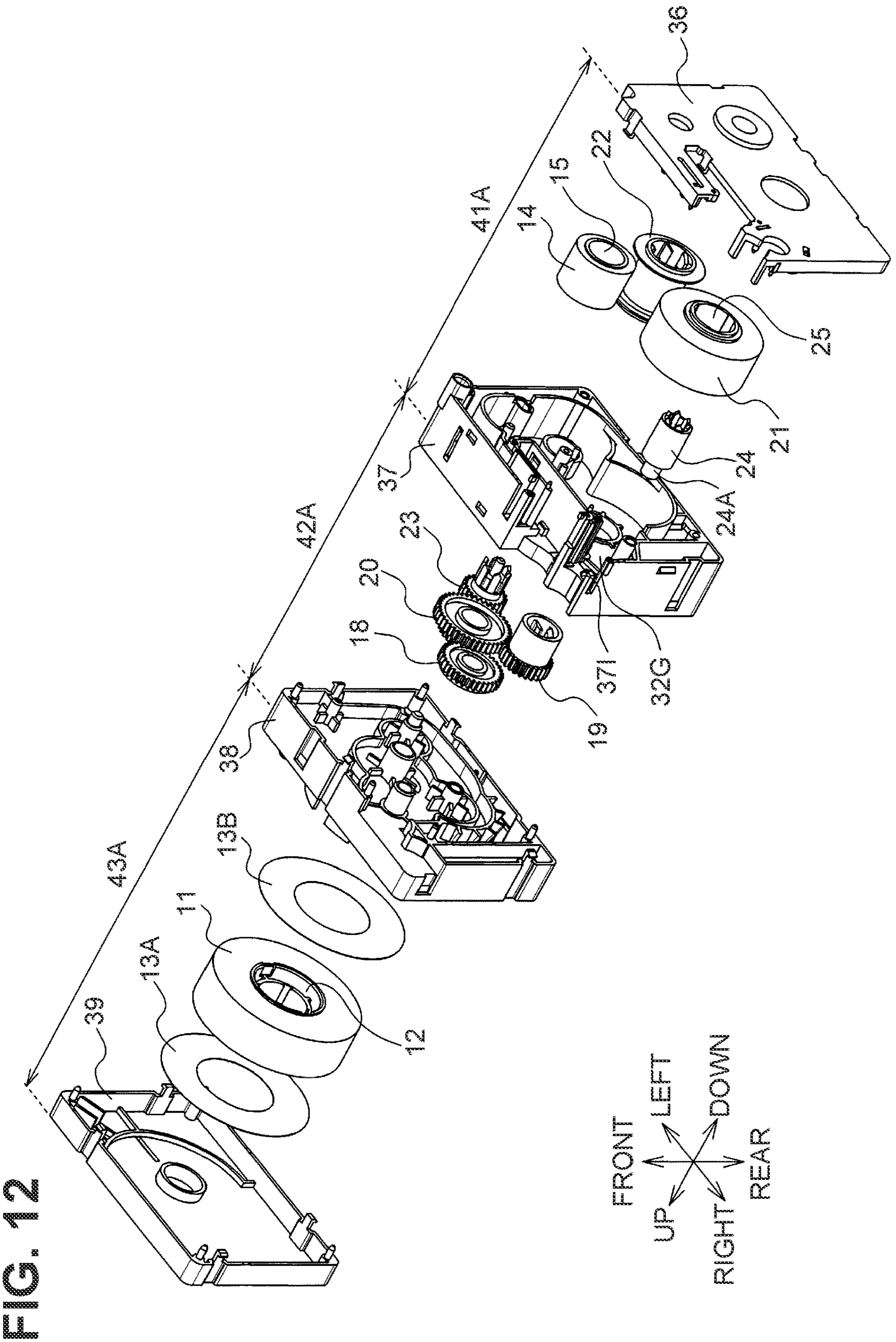
FIG. 12 is a disassembled schematic perspective view of the printing cassette in the printer of FIG. 11A.

The printing cassette 10A includes a third roll 21, an additional spool 22, an additional gear 23, and a pinch roller 24, each of which are illustrated in FIG. 12, in addition to the components of the printing cassette 10 of the first illustrative embodiment, and further includes a third feed spool 25, a first cover portion 36, a first frame portion 37, a second frame portion 38, and a second cover portion 39 as alternatives to the input spool 16, the first cover portion 31, the first frame portion 32, the second frame portion 33, and the second cover portion 34 of the printing cassette 10 of the first illustrative embodiment.

The first cover portion 36 and the first frame portion 37 constitute a first case portion 41A. The first frame portion 37 and the second frame portion 38 constitute a second case portion 42A. The second frame portion 38 and the second cover portion 39 constitute a third case portion 43A.

The third feed spool 25 is identical to the input spool 16 except that the third feed spool 25 does not have the spline teeth 16B. The first cover portion 36, the first frame portion 37, the second frame portion 38, and the second cover portion 39 are identical to the first cover portion 31, the first frame portion 32, the second frame portion 33, and the second cover portion 34 that are further extended in the right-left direction, respectively. The other configurations of the printing cassette 10A are the same as those of the printing cassette 10 of the first illustrative embodiment except for the points described below, and thus a description thereof will be omitted.

In the third roll 21, a laminating tape used for protecting the to-be-printed tape is wound around the third feed spool 25. The laminating tape has an adhesive surface to be adhered to the to-be-printed tape on which printing has been performed by the print head 102.

The additional spool 22 is rotatable about its rotation axis. The rotation axis of the additional spool 22 is parallel to the rotation axis of the second feed spool 15 (i.e., the up-down direction). The additional spool 22 is a take-up spool that takes up the ink ribbon by rotation of the additional gear 23.

The additional gear 23 is connected to the additional spool 22 and is in engagement with the idle gear 20. The additional gear 23 is rotated by a driving force input to the input gear 19 and rotates the additional spool 22.

The pinch roller 24 lays the laminating tape over the to-be-printed tape and presses the laminating tape toward the to-be-printed tape on which printing has been performed, in cooperation with a pressing roller 106. The pinch roller 24 is disposed downstream from the head opening 32B in the conveyance direction of the to-be-printed tape.

At least a portion (i.e., a portion drawn from the first roll 11) of the to-be-printed tape, at least a portion of the laminating tape, and at least a portion of the pinch roller 24 are arranged next to each other in directions (i.e., the front-rear direction and the left-right direction) perpendicular to the up-down direction and accommodated in the first case portion 41A.

The pinch roller 24 is supported by the second case portion 42A such that at least a portion of the pinch roller 24 overlaps the second case portion 42A in directions (i.e., the front-rear direction and the left-right direction) perpendicular to the up-down direction.

Specifically, an upper end portion of a shaft portion 24A of the pinch roller 24 is inserted in a recessed portion 371 defined in the first separation wall 32G of the first frame portion 37. The recessed portion 371 is a portion of the second case portion 42A.

<Printer Body>

The printer body 100A is identical to the printer body 100 of the first illustrative embodiment to which the pressing roller 106 illustrated in FIG. 12 is added. The other configurations of the printer body 100A are the same as those of the printer body 100 of the first illustrative embodiment except for the points described below, and thus a description thereof will be omitted.

Figure 13:
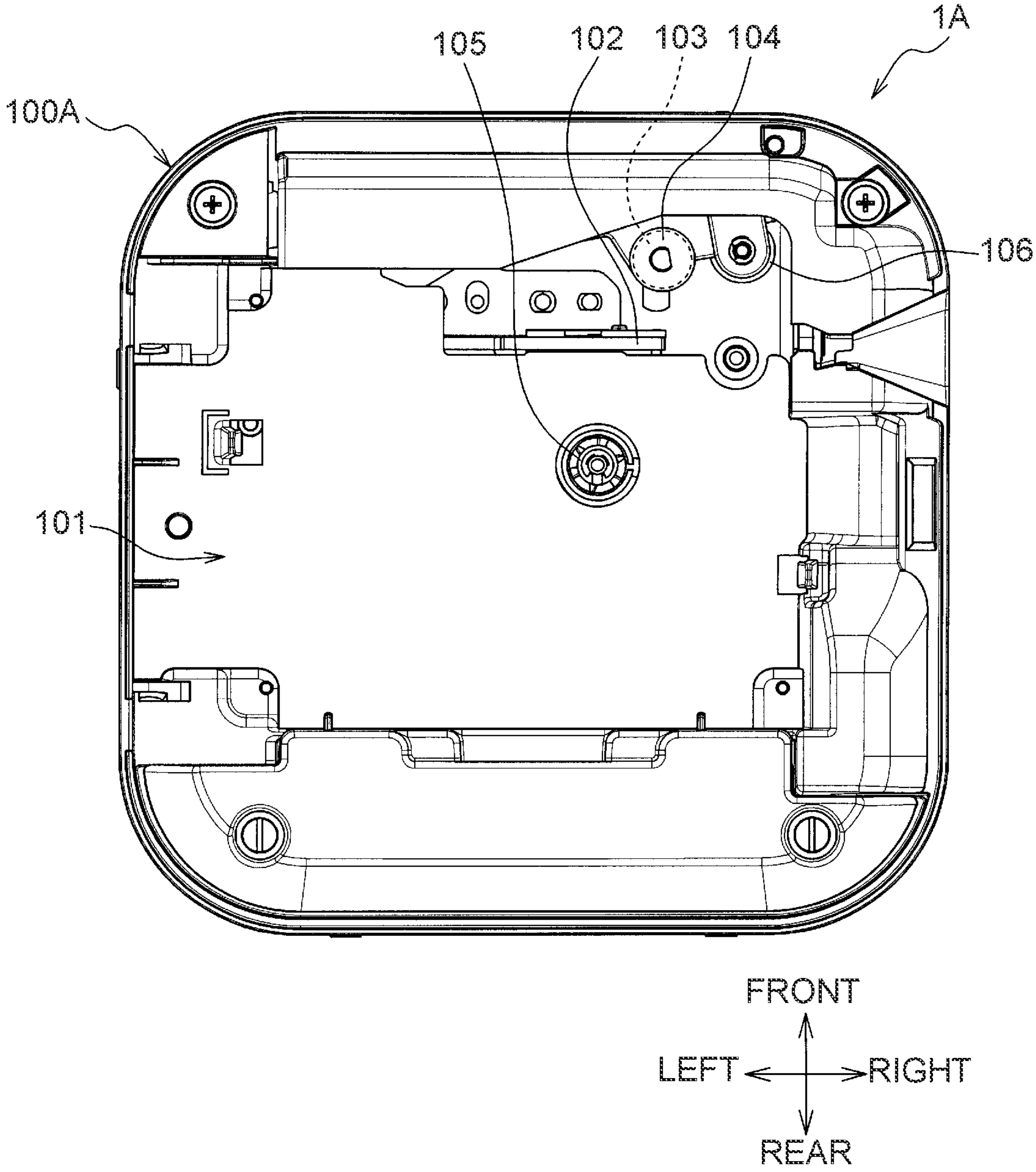
FIG. 13 is a schematic plan view illustrating the printer body of the printer of FIG. 11A.
Figure 14:
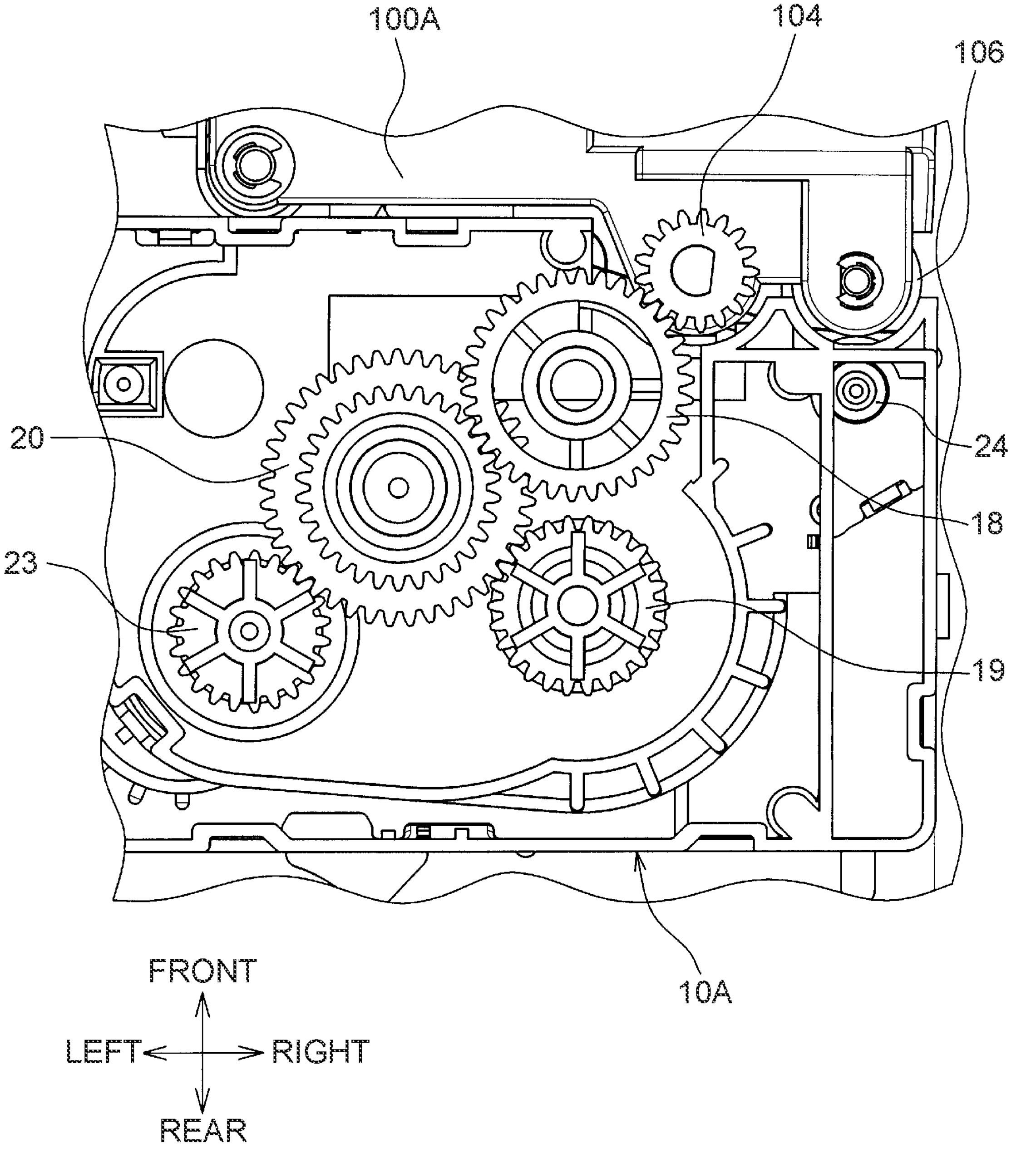
FIG. 14 is a schematic view illustrating a state in which an output gear and a platen gear are in engagement with each other in the printer of FIG. 11A.

The pressing roller 106 is configured to be swingable together with the platen roller 103 and the platen gear 104. That is, the pressing roller 106 are swingable between a position illustrated in FIG. 13 where the pressing roller 106 is spaced from the printing cassette 10A and a position illustrated in FIG. 14 where the pressing roller 106 presses the to-be-printed tape and the laminating tape in cooperation with the pinch roller 24.

2-2. Effects

According to the illustrative embodiment described in detail above, the following effects may be obtained.

(2a) While having the same advantages as those of the first illustrative embodiment, contents printed on the to-be-printed tape may be protected by the laminating tape.

(2b) The particular portion of the pinch roller 24 overlaps the second case portion 42A in the directions perpendicular to the up-down direction. Therefore, the pinch roller 24 may be readily assembled to the case 35. As a result, productivity of the printing cassette 10 is improved.

3. Other Illustrative Embodiments

Although the illustrative embodiments of the disclosure have been described above, it is needless to say that the disclosure is not limited to the above-described illustrative embodiments and may adopt various illustrative embodiments.

(3a) The printers of the above-described illustrative embodiments are not limited to printers that perform printing using an ink ribbon. The printers may perform printing using a heat-sensitive sheet that is a continuous strip as a to-be-printed tape. In addition, a printing cassette might not necessarily include a roll of an ink ribbon and a second feed spool.

Figure 15:
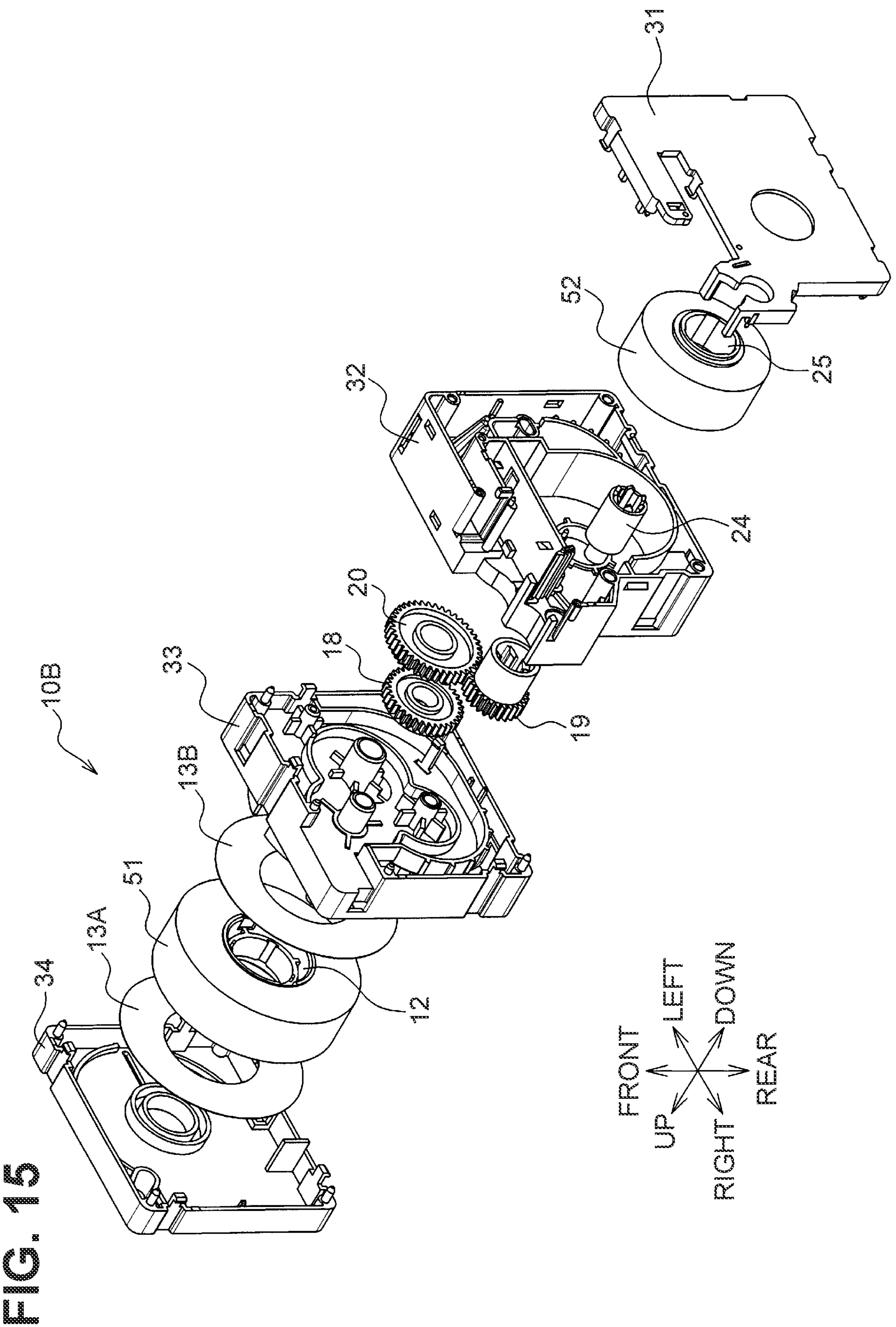
FIG. 15 is a disassembled schematic perspective view of a printing cassette for a printer according to an illustrative embodiment different from the illustrative embodiments illustrated in FIGS. 1A and 11A.

For example, a printing cassette 10B illustrated in FIG. 15 is identical to the printing cassette 10 of the first illustrative embodiment including a roll 51 of a heat-sensitive sheet and a third roll 52 of a laminating tape as alternatives to the first roll 11 and the second roll 14, respectively.

In the printing cassette 10B, the third roll 52 is wound around the third feed spool 25 of the second illustrative embodiment. The printing cassette 10B includes the pinch roller 24 of the second illustrative embodiment, but does not include the second feed spool 15.

(3b) In the printing cassettes of the above-described illustrative embodiments, relationships of the volumes, the total weights, and the dimensions in the up-down direction between the first case portion, the second case portion, and the third case portion are not limited to those described above. The first case portion, the second case portion, and the third case portion may include parts other than the first cover portion, the first frame portion, the second frame portion, and the second cover portion described above.

(3c) In the printing cassette of the second illustrative embodiment, a laminating tape may be wound around the additional spool.

Figure 16:
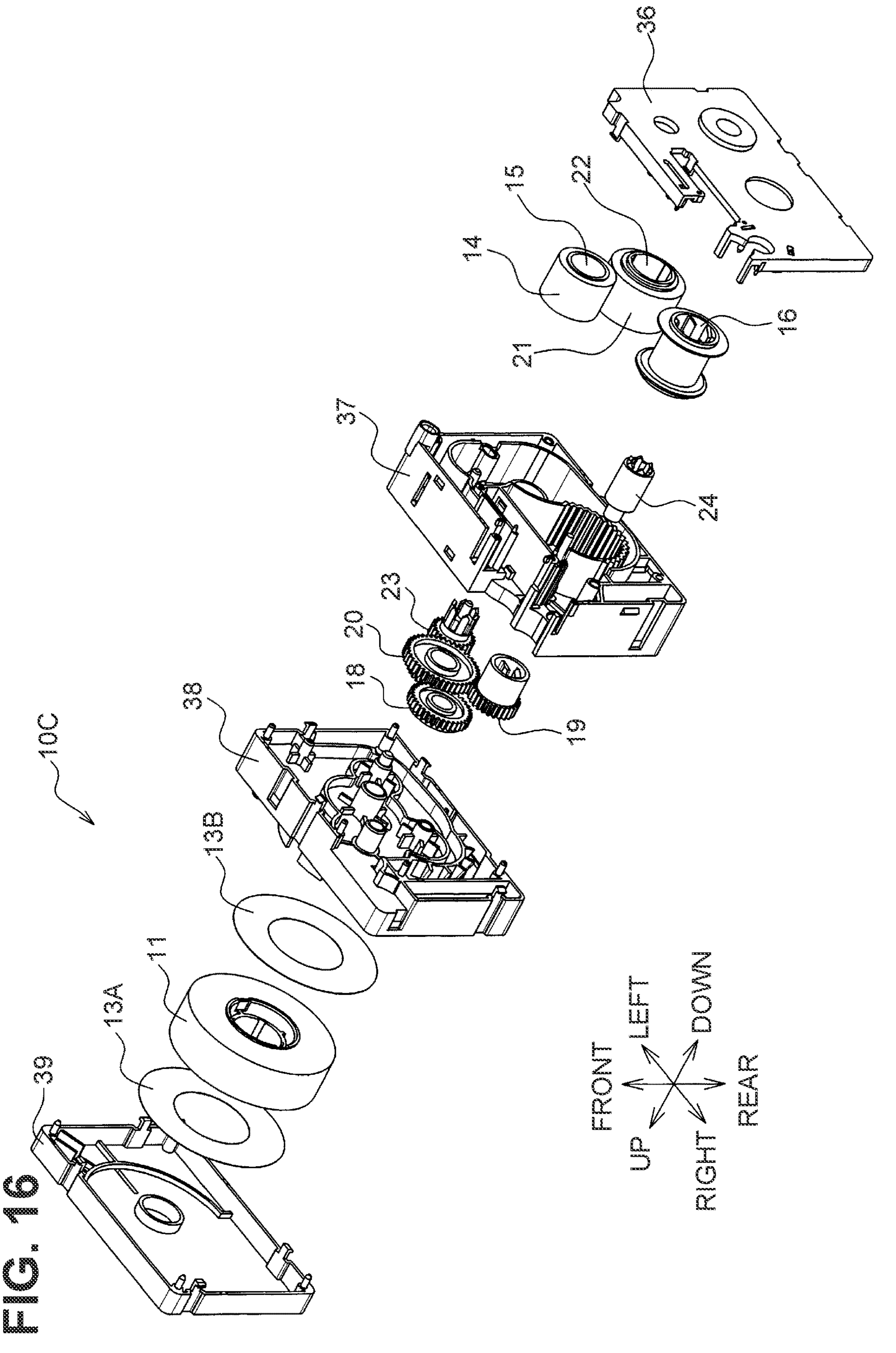
FIG. 16 is a disassembled schematic perspective view of a printing cassette for a printer according to an illustrative embodiment different from the illustrative embodiments illustrated in FIGS. 1A, 11A, and 15.

For example, a printing cassette 10C illustrated in FIG. 16 is identical to the printing cassette 10A of the second illustrative embodiment in which a third roll 21 of a laminating tape is wound around the additional spool 22. The printing cassette 10C includes the input spool 16 of the first illustrative embodiment as an alternative to the third feed spool 25 of the second illustrative embodiment. The input spool 16 is used as a take-up spool for an ink ribbon.

(3d) The functions of a single component in the above-described illustrative embodiments may be achieved by multiple components, or the functions of respective multiple components may be achieved by a single component. Further, some of the configurations of the above-described illustrative embodiments may be omitted. In addition, at least some of the configurations of one or more of the above-described illustrative embodiments may be added to or replaced with the configurations of another illustrative embodiment. It should be noted that all aspects included in the technical idea specified by the wording described in the claims are illustrative embodiments of the disclosure.

What is claimed is:

1. A printing cassette comprising:
- a case including a first case portion, a second case portion, and a third case portion;
- a first tape, at least a portion of which is accommodated in the third case portion; and
- a gear being partially exposed from the case, wherein:
- the first case portion, the second case portion, and the third case portion are disposed in an order of the first case portion, the second case portion, and the third case portion in a first direction.

2. The printing cassette according to claim 1, wherein:
- the first case portion includes:
  - a protruding portion having a first surface defining a head opening; and
  - a facing portion defining the head opening, the facing portion having a second surface facing the first surface in a second direction orthogonal to the first direction, and
- the second case portion has a third surface, the third surface being disposed at an end of the head opening in the first direction and connecting between the protruding portion and the facing portion.

3. The printing cassette according to claim 1, wherein a volume of an internal space of the third case portion is greater than a volume of an internal space of the first case portion.

4. The printing cassette according to claim 1, wherein a total weight of the third case portion and components accommodated in the third case portion is greater than a total weight of the first case portion and components accommodated in the first case portion.

5. The printing cassette according to claim 1, wherein:
- the first case portion and the second case portion are separated by a first separation wall, and
- the second case portion and the third case portion are separated by a second separation wall.

6. The printing cassette according to claim 1, further comprising:
- a first cover portion;
- a first frame portion connected to the first cover portion in the first direction;
- a second frame portion connected to the first frame portion in the first direction; and
- a second cover portion connected to the second frame portion in the first direction, wherein:
- the first case portion includes the first cover portion and a first portion of the first frame portion in the first direction,
- the second case portion includes a second portion of the first frame portion and a third portion of the second frame portion in the first direction, the second portion being a side opposite to the third direction in the first direction, and
- the third case portion includes a fourth portion of the second frame portion and the second cover portion, the fourth portion being a side opposite to the third portion in the first direction.

7. The printing cassette according to claim 6, wherein a dimension of the second frame portion in the first direction is greater than a dimension of the first frame portion in the first direction.

8. The printing cassette according to claim 6, wherein the gear is disposed between claws connecting between the first frame portion and the second frame portion.

9. The printing cassette according to claim 1, wherein a dimension of the first case portion in the first direction and a dimension of the third case portion in the first direction are greater than a dimension of the second case portion in the first direction.

10. The printing cassette according to claim 9, wherein the dimension of the first case portion in the first direction is equal to or greater than the dimension of the third case portion in the first direction.

11. The printing cassette according to claim 1, further comprising:
- a second tape; and
- a roller that lays the second tape over the first tape, wherein:
- at least a portion of the first tape, at least a portion of the second tape, and at least a portion of the roller are arranged next to each other in the first direction and accommodated in the first case portion, and
- the roller is supported by the second case portion such that at least a portion of the roller overlaps the second case portion in a direction orthogonal to the first direction.

12. The printing cassette according to claim 1, further comprising a restricting portion that restricts movement of the first tape in a width direction of the first tape,
- wherein the first case portion has an outlet through which the first tape is discharged, and
- wherein the restricting portion is disposed between ends of the outlet in the width direction of the first tape.

13. The printing cassette according to claim 1, further comprising:

a roll for the first tape; and a restricting portion that restricts movement of the first tape in a width direction of the first tape, wherein:

the roll is accommodated in the third case portion, and the restricting portion is disposed between ends of the roll in the width direction of the first tape.

14. The printing cassette according to claim 1, further comprising a roll for the first tape, wherein:

the first case portion has an outlet through which the first tape is discharged, the roll is accommodated in the third case portion, and the first tape drawn from the roll is discharged from the outlet via the second case portion and the first case portion.

15. The printing cassette according to claim 14, wherein the second case portion includes a partition wall that separates a space in which the gear is disposed and a space through which the first tape travels.

16. The printing cassette according to claim 1, further comprising an ink ribbon, wherein:

at least a portion of the ink ribbon is accommodated in the first case portion, the first case portion has an outlet for opening through which the first tape is discharged to a head opening, and the ink ribbon is to be laid over the first tape discharged from the outlet for opening.

17. A printer comprising:

the printing cassette according to claim 1; and a printer body on which the printing cassette is to be mounted, wherein the printer body includes a driving force transmission portion to be engaged with the gear.

18. A printing cassette comprising:

a case;

a first tape roll, at least a portion of which is accommodated in the case and into which a first tape is wound; and a gear, at least a portion of which is accommodated in the case, wherein:

the case has an outlet through which the first tape is discharged; and the outlet, the gear, and the first tape roll are disposed in an order of the outlet, the gear, and the first tape in a first direction.

19. A printing cassette comprising:

a case;

a first tape roll, at least a portion of which is accommodated in the case and into which a first tape is wound; and a gear, at least a portion of which is accommodated in the case, wherein:

the case has a head opening, and the head opening, the gear, and the first tape roll are disposed in an order of the head opening, the gear, and the first tape in a first direction.

* * * * *